United States Patent
Shimizu

(10) Patent No.: US 11,235,244 B2
(45) Date of Patent: Feb. 1, 2022

(54) GAMING SYSTEM, GAMING METHOD, SERVER DEVICE, TERMINAL DEVICE, AND PROGRAM

(71) Applicant: MIKADO GAMES LIMITED, Macao (CN)

(72) Inventor: Keita Shimizu, Tokyo (JP)

(73) Assignee: MIKADO GAMES LIMITED, Macao (CN)

( * ) Notice: Subject to any disclaimer, the term of this patent is extended or adjusted under 35 U.S.C. 154(b) by 184 days.

(21) Appl. No.: 16/496,992

(22) PCT Filed: Jul. 3, 2017

(86) PCT No.: PCT/JP2017/024321
§ 371 (c)(1),
(2) Date: Sep. 24, 2019

(87) PCT Pub. No.: WO2019/008622
PCT Pub. Date: Jan. 10, 2019

(65) Prior Publication Data
US 2020/0094143 A1 Mar. 26, 2020

(51) Int. Cl.
*A63F 13/573* (2014.01)
*A63F 13/577* (2014.01)
(Continued)

(52) U.S. Cl.
CPC .......... *A63F 13/573* (2014.09); *A63F 13/577* (2014.09); *A63F 13/812* (2014.09); *G06F 7/588* (2013.01); *A63F 2300/61* (2013.01)

(58) Field of Classification Search
CPC .... A63F 13/573; A63F 13/577; A63F 13/812; A63F 2300/61; G06F 7/588
See application file for complete search history.

(56) References Cited

U.S. PATENT DOCUMENTS

| | | | | |
|---|---|---|---|---|
| 3,715,624 A | * | 2/1973 | Herman | A63F 9/0468 315/209 R |
| 4,455,024 A | * | 6/1984 | Yanagawa | A63F 9/24 463/2 |

(Continued)

FOREIGN PATENT DOCUMENTS

| | | |
|---|---|---|
| JP | 2004-321303 | 11/2004 |
| JP | 2007-506520 | 3/2007 |

(Continued)

OTHER PUBLICATIONS

International Search Report for PCT/JP2017/024321 dated Sep. 26, 2017, 4 pages.

(Continued)

*Primary Examiner* — David L Lewis
*Assistant Examiner* — Matthew D Hoel
(74) *Attorney, Agent, or Firm* — Nixon & Vanderhye, P.C.

(57) ABSTRACT

A gaming device is provided. The gaming device has: a state deciding unit configured to accept an input from the user while a display object displayed on a display screen is performing a given movement and thereby decide the state of the display object performing the given movement; a random number generating unit configured to randomly generate a value from among numerical values in a predetermined given range; and a determining unit configured to determine a game result based on a value corresponding to the state of the display object decided by the state deciding unit and the value generated by the random number generating unit.

8 Claims, 15 Drawing Sheets

(51) Int. Cl.
*A63F 13/812* (2014.01)
*G06F 7/58* (2006.01)

(56) References Cited

U.S. PATENT DOCUMENTS

| | | | | |
|---|---|---|---|---|
| 6,422,939 | B1* | 7/2002 | Koyama | A63F 13/10 |
| | | | | 463/6 |
| 8,727,349 | B2* | 5/2014 | Hodges | G06F 7/588 |
| | | | | 273/139 |
| 8,740,703 | B2* | 6/2014 | Hirose | G06F 7/588 |
| | | | | 463/36 |
| 8,851,993 | B2* | 10/2014 | Nishiya | A63F 13/573 |
| | | | | 463/36 |
| 9,751,002 | B2* | 9/2017 | Frank | G07C 15/001 |
| 10,124,262 | B2* | 11/2018 | Kaiblinger | A63F 13/812 |
| 2004/0214623 | A1* | 10/2004 | Takahashi | A63F 13/10 |
| | | | | 463/2 |
| 2005/0037832 | A1 | 2/2005 | Cannon | |
| 2006/0128468 | A1 | 6/2006 | Yoshikawa et al. | |
| 2011/0095483 | A1* | 4/2011 | Stein | G06F 7/588 |
| | | | | 273/298 |
| 2011/0300935 | A1 | 12/2011 | Yoshikawa et al. | |
| 2011/0319150 | A1* | 12/2011 | Hodges | A63F 3/0665 |
| | | | | 463/17 |
| 2012/0053015 | A1* | 3/2012 | Esaki | A63B 69/00 |
| | | | | 482/8 |
| 2012/0309521 | A1* | 12/2012 | Nishiya | A63F 13/533 |
| | | | | 463/31 |
| 2013/0190085 | A1 | 7/2013 | Yoshikawa et al. | |
| 2013/0288796 | A1* | 10/2013 | Hirose | A63F 13/35 |
| | | | | 463/36 |
| 2013/0303245 | A1* | 11/2013 | Shinoda | A63F 13/812 |
| | | | | 463/2 |
| 2015/0005048 | A1* | 1/2015 | Kaiblinger | G06F 7/588 |
| | | | | 463/22 |
| 2016/0375352 | A1* | 12/2016 | Frank | G07F 17/34 |
| | | | | 463/19 |
| 2020/0094143 | A1* | 3/2020 | Shimizu | A63F 13/818 |
| 2020/0129847 | A1* | 4/2020 | Andersen | A63F 3/00075 |
| 2020/0360798 | A1* | 11/2020 | Saunders | A63F 3/00157 |
| 2020/0406125 | A1* | 12/2020 | Tsang | G07F 17/322 |
| 2021/0081177 | A1* | 3/2021 | Anderson | A63F 9/24 |

FOREIGN PATENT DOCUMENTS

| | | |
|---|---|---|
| JP | 2007-181493 | 7/2007 |
| JP | 2007-517532 | 7/2007 |
| JP | 2011-24607 | 2/2011 |
| JP | 2011-67677 | 4/2011 |

OTHER PUBLICATIONS

Written Opinion of the ISA for PCT/JP2017/024321 dated Sep. 26, 2017, 4 pages.

* cited by examiner

FIG. 7

| IDENTIFICATION NUMBER | 1 | 2 | 3 | 4 | 5 | 6 | 7 | 8 | 9 | 10 |
|---|---|---|---|---|---|---|---|---|---|---|
| DIRECTION RANGE VALUE | $0 \leq A < 0.1$ | $0.1 \leq A < 0.2$ | $0.2 \leq A < 0.3$ | $0.3 \leq A < 0.4$ | $0.4 \leq A < 0.5$ | $0.5 \leq A < 0.6$ | $0.6 \leq A < 0.7$ | $0.7 \leq A < 0.8$ | $0.8 \leq A < 0.9$ | $0.9 \leq A \leq 1$ |
| DIRECTION REFERENCE VALUE | 50 | 90 | 80 | 70 | 60 | 60 | 70 | 80 | 90 | 50 |

| IDENTIFICATION NUMBER | 1 | 2 | 3 | 4 | 5 | 6 | 7 | 8 | 9 | 10 |
|---|---|---|---|---|---|---|---|---|---|---|
| POWER RANGE VALUE | $0 \leq B < 0.1$ | $0.1 \leq B < 0.2$ | $0.2 \leq B < 0.3$ | $0.3 \leq B < 0.4$ | $0.4 \leq B < 0.5$ | $0.5 \leq B < 0.6$ | $0.6 \leq B < 0.7$ | $0.7 \leq B < 0.8$ | $0.8 \leq B < 0.9$ | $0.9 \leq B \leq 1$ |
| POWER REFERENCE VALUE | 50 | 90 | 80 | 70 | 60 | 60 | 70 | 80 | 90 | 50 |

216

| SUCCESS/FAILURE OF DIRECTION | SUCCESS/FAILURE OF POWER | SUCCESS/FAILURE OF GAME |
|---|---|---|
| SUCCESS | SUCCESS | GOAL |
| SUCCESS | FAILURE | MISS |
| FAILURE | SUCCESS | MISS |
| FAILURE | FAILURE | MISS |

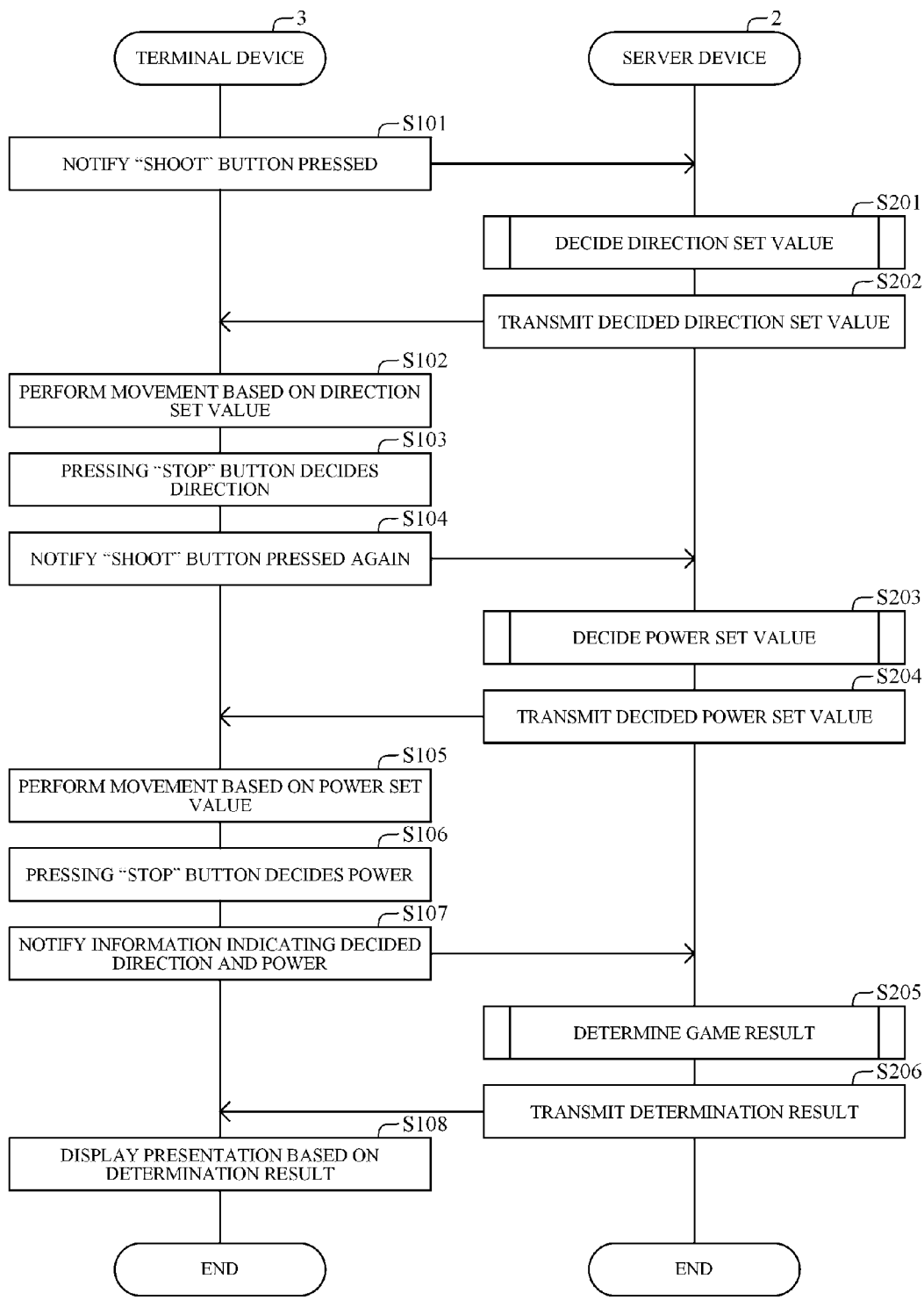

| POSITION | POINT |
|---|---|
| 0 | 0 POINT |
| 1 | DOUBLE POINTS |
| 2 | SAME POINTS |
| 3 | TRIPLE POINTS |
| 4 | SAME POINTS |
| 5 | 25 POINTS |
| 6 | 50 POINTS |

FIG. 20

|  | 0→<br>12.99 | 13→<br>25.99 | 26→<br>38.99 | 39→<br>51.99 | 52→<br>64.99 | 65→<br>77.99 | 78→<br>90.99 | 91→<br>104 |
|---|---|---|---|---|---|---|---|---|
| No.1 | 11.40→<br>39.79 | 50.45→<br>51.08 | 61.66→<br>63.07 | 68.32→<br>72.44 | 73.29→<br>77.01 | 78.99→<br>87.18 | 87.05→<br>88.56 | 92.30→<br>94.33 |
| No.2 | 25.67→<br>36.89 | 45.67→<br>50.78 | 60.37→<br>61.25 | 62.31→<br>70.22 | 71.71→<br>75.68 | 76.82→<br>90.00 | 91.66→<br>98.48 | 99.18→<br>100 |
| No.3 | 10.21→<br>32.49 | 49.00→<br>51.28 | 62.10→<br>63.76 | 70.77→<br>73.37 | 75.29→<br>87.99 | 89.12→<br>93.47 | 94.00→<br>95.21 | 96.81→<br>99.73 |
| No.4 | 33.98→<br>60.00 | 64.31→<br>60.00 | 70.51→<br>77.18 | 79.87→<br>85.51 | 88.00→<br>90.67 | 92.78→<br>94.77 | 95.00→<br>96.00 | 96.64→<br>98.65 |
| No.5 | 0.00→<br>25.00 | 61.00→<br>62.77 | 65.86→<br>70.20 | 74.33→<br>77.67 | 79.23→<br>86.44 | 87.58→<br>90.92 | 92.11→<br>94.06 | 96.45→<br>99.50 |
| ⋮ | ⋮ | ⋮ | ⋮ | ⋮ | ⋮ | ⋮ | ⋮ | ⋮ |

FIG. 21

|  | DIRECTION | STRENGTH |
|---|---|---|
| PATTERN1 | 47.64 | 78.35 |
| PATTERN2 | 65.31 | 87.59 |
| PATTERN3 | 81.15 | 98.82 |
| ⋮ | ⋮ | ⋮ |

FIG. 22A

| | E | D | C | B | A |
|---|---|---|---|---|---|
| CONTRAST VALUE (ANGLE) | 0~80.99 | 81~81.99 | 82~87.99 | 88~93.99 | 94~100 |
| CONTRAST VALUE (POWER) | 0~89.99 | 90~93.99 | 94~96.99 | 97~98.99 | 99~100 |

FIG. 22B

| CONTRAST VALUE (ANGLE) | CONTRAST VALUE (POWER) | RESULT |
|---|---|---|
| A | A | FISH#1, FISH#2, FISH#3, MISSING FISH |
| A | B | FISH#2, FISH#3, MISSING FISH |
| A | C | FISH#1, MISSING ITEM, MISSING FISH |
| ⋮ | ⋮ | ⋮ |

GAMING SYSTEM, GAMING METHOD, SERVER DEVICE, TERMINAL DEVICE, AND PROGRAM

This application is the U.S. national phase of International Application No. PCT/JP2017/024321 filed Jul. 3, 2017, the entire contents of which is hereby incorporated by reference.

TECHNICAL FIELD

The present invention relates to a gaming system, a gaming method, a gaming device, a terminal device, and a program. More specifically, the present invention relates to a gaming system using random numbers, a gaming method, a gaming device, a terminal device, and a program.

BACKGROUND ART

In gaming machines for playing various games such as a casino game machine, a pachinko and a Japanese slot machine, a technique of RNG (Random Number Generator) to generate random numbers by using a program or the like is sometimes used.

For example, Patent Document 1 discloses a technique using a pseudo random number value generated by a random number generator (a pseudo random number generator) in a gaming machine for playing a game of predicting the order of arrival of competition objects such as horses. According to Patent Document 1, the gaming machine uses, as a variable, a pseudo random number value generated with acquired numerical value information as an initial value by the pseudo random number generator at the time of determining the order of a plurality of races and the types of the races and at the time of determining the order of arrival of a plurality of competition objects participating in the race. Moreover, it is determined in advance in what order the pseudo random number value used at the time of determining the order of a plurality of races and the types of the races and the pseudo random number value used at the time of determining the order of arrival of competition objects are generated after the numerical value information is given as the initial value in the pseudo random number value generator. According to Patent Document 1, such a configuration allows a plurality of gaming machines to do the same race at the same time and make the orders of arrival in the race coincide between the gaming machines without allowing the players to predict the orders of arrival of the race on the basis of the result of a past race.

Further, Patent Document 2 discloses a method for offering a gambling game to the user of a personal game device in the casino environment. According to Patent Document 2, the result of the game is transmitted to the personal game device. For example, the result of the game includes numerical value data generated by one or more random number generators, and the numerical value data represent a given game outcome.

Patent Document 1: Japanese Unexamined Patent Application Publication No. JP-A 2011-024607

Patent Document 2: Japanese Unexamined Patent Application Publication No. JP-A 2007-506520

According to the techniques as disclosed in Patent Documents 1 and 2, the order of arrival in a race and the result of a game are determined in accordance with random numbers. Therefore, there is no room for reflecting the user's operation and so on, and there is a problem that improvement of the user's operation skill and so on cannot be reflected onto the result of a game.

SUMMARY

Accordingly, an object of the present invention is to provide a gaming system, a gaming method, a gaming device and a program which solve a problem that it is difficult to, in a device using RNG, reflect the result of the user's operation onto the result of a game.

In order to achieve the object, a gaming system as an aspect of the present invention includes:

a state deciding unit configured to accept an input from a user while a display object displayed on a display screen is performing a given movement and thereby decide a state of the display object performing the given movement;

a random number generating unit configured to randomly generate a value from among numerical values in a predetermined given range; and a determining unit configured to determine a game result based on a value corresponding to the state of the display object decided by the state deciding unit and the value generated by the random number generating unit.

Further, in the gaming system:

the state deciding unit includes: a first state deciding unit configured to accept an input from the user while a display object displayed on the display screen is performing a first given movement and thereby decide a state of the display object performing the first given movement; and a second state deciding unit configured to accept an input from the user while the display object displayed on the display screen is performing a second given movement and thereby decide a state of the display object performing the second given movement; and the determining unit is configured to determine a game result based on a value corresponding to the state of the display object performing the first given movement decided by the first state deciding unit, a value corresponding to the state of the display object performing the second given movement decided by the second state deciding unit, and the value generated by the random number generating unit.

Further, in the gaming system, the determining unit is configured to: perform first judgment based on the value corresponding to the state of the display object performing the first given movement decided by the first state deciding unit and the value generated by the random number generating unit; perform second judgment based on the value corresponding to the state of the display object performing the second given movement decided by the second state deciding unit and the value generated by the random number generating unit at a different moment from when performing the first judgment; and determine the game result based on the first judgment and the second judgment.

Further, in the gaming system, the determining unit is configured to: in accordance with a position specified on a basis of the value corresponding to the state of the display object performing the first given movement decided by the first state deciding unit and the value corresponding to the state of the display object performing the second given movement decided by the second state deciding unit, acquire a given score previously associated with the position; acquire given operation information corresponding to a range obtained by correcting a range corresponding to the position in accordance with the value generated by the random number generating unit; operate the score on a basis of the operation information; and thereby calculate a value indicating a game result.

Further, in the gaming system, the determining unit is configured to: calculate a first value based on the value corresponding to the state of the display object performing the first given movement decided by the first state deciding unit and based on a value specified on a basis of the value corresponding to the state of the display object performing the first given movement and the value generated by the random number generating unit; calculate a second value based on the value corresponding to the state of the display object performing the second given movement decided by the second state deciding unit and based on a value specified on a basis of the value corresponding to the state of the display object performing the second given movement and the value generated by the random number generating unit; and determine a game result based on the calculated first value and second value.

Further, in the gaming system, the determining unit is configured to, on a basis of the value generated by the random number generating unit, correct the value corresponding to the state of the display object performing the first given movement decided by the first state deciding unit and the value corresponding to the state of the display object performing the second given movement decided by the second state deciding unit, and thereby calculate a value indicating a game result.

Further, in the gaming system, the determining unit is configured to: acquire a range value indicating what range in the whole given movement the state of the display object decided by the state deciding unit is included; on a basis of a previously stored correspondence table showing correspondence between the range value and a reference value, acquire the reference value corresponding to the range value; and determine a game result based on the acquired reference value and the value generated by the random number generating unit.

Further, the gaming system further includes a set value deciding unit configured to decide a set value for controlling the given movement performed by the display object in accordance with a predetermined start trigger that instructs start of the given movement by the display object. The state deciding unit is configured to, on a basis of the set value decided by the set value deciding unit, control so that the display object starts the given movement.

Further, a gaming method as another aspect of the present invention is a method executed by a gaming system.

The gaming method includes:
accepting an input from a user while a display object displayed on a display screen is performing a given movement and thereby deciding a state of the display object performing the given movement;
randomly generating a value from among numerical values in a predetermined given range; and
determining a game result based on a value corresponding to the decided state of the display object and based on the generated value.

Further, a server device as another aspect of the present invention includes:
an information accepting unit configured to accept, from an external device, information showing a state of a display object displayed on a display screen, the state being decided by a state deciding unit configured to accept an input from a user while the display object is performing a given movement and thereby decide the state of the display object performing the given movement;
a random number generating unit configured to randomly generate a value from among numerical values in a predetermined given range;
a determining unit configured to determine a game result based on a value corresponding to the state of the display object shown by the information accepted by the information accepting unit and based on the value generated by the random number generating unit; and
a transmitting unit configured to transmit the result of the determination by the determining unit to the external device.

Further, a program as another aspect of the present invention is a program including instructions for causing a server device to realize:
an information accepting unit configured to accept, from an external device, information showing a state of a display object displayed on a display screen, the state being decided by a state deciding unit configured to accept an input from a user while the display object is performing a given movement and thereby decide the state of the display object performing the given movement;
a random number generating unit configured to randomly generate a value from among numerical values in a predetermined given range;
a determining unit configured to determine a game result based on a value corresponding to the state of the display object shown by the information accepted by the information accepting unit and based on the value generated by the random number generating unit; and
a transmitting unit configured to transmit the result of the determination by the determining unit to the external device.

Further, a terminal device as another aspect of the present invention includes:
a state deciding unit configured to accept an input from a user while a display object displayed on a display screen is performing a given movement and thereby decide the state of the display object performing the given movement;
a transmitting unit configured to transmit information showing the state of the display object decided by the state deciding unit to the external device; and
a receiving unit configured to receive information showing a game result determined by the external device on a basis of a value corresponding to the state of the display object shown by the information transmitted by the transmitting unit and a value generated by a random number generating unit configured to randomly decide a value from among numerical values in a predetermined given range.

Further, a program as another aspect of the present invention is a program comprising instructions for causing a terminal device to realize:
a state deciding unit configured to accept an input from a user while a display object displayed on a display screen is performing a given movement and thereby decide the state of the display object performing the given movement;
a transmitting unit configured to transmit information showing the state of the display object decided by the state deciding unit to the external device; and
a receiving unit configured to receive information showing a game result determined by the external device on a basis of a value corresponding to the state of the display object shown by the information transmitted by the transmitting unit and a value generated by a random number generating unit configured to randomly decide a value from among numerical values in a predetermined given range.

With the configurations described above, the present invention can provide a gaming system, a gaming method, a gaming device and a program which solve the problem that it is difficult to, in a device using RNG, reflect the result of the user's operation onto the result of a game.

BRIEF DESCRIPTION OF DRAWINGS

FIG. 7 is a view showing an example of a configuration of a direction reference value table shown in FIG. 2;

FIG. 8 is a view showing an example of a configuration of a power reference value table shown in FIG. 2;

FIG. 12 is a flowchart showing an example of an operation of the whole gaming system;

FIG. 20 is a view showing an example of a table used in the other gaming system to which the present invention can be applied;

FIG. 21 is a view showing an example of a table used at the time of determining the result of a game in the other gaming system to which the present invention can be applied; and FIG. 22 is a view showing an example of a table used at the time of determining the result of a game in the other gaming system to which the present invention can be applied.

EXAMPLE EMBODIMENTS

First Example Embodiment

Figure 1:
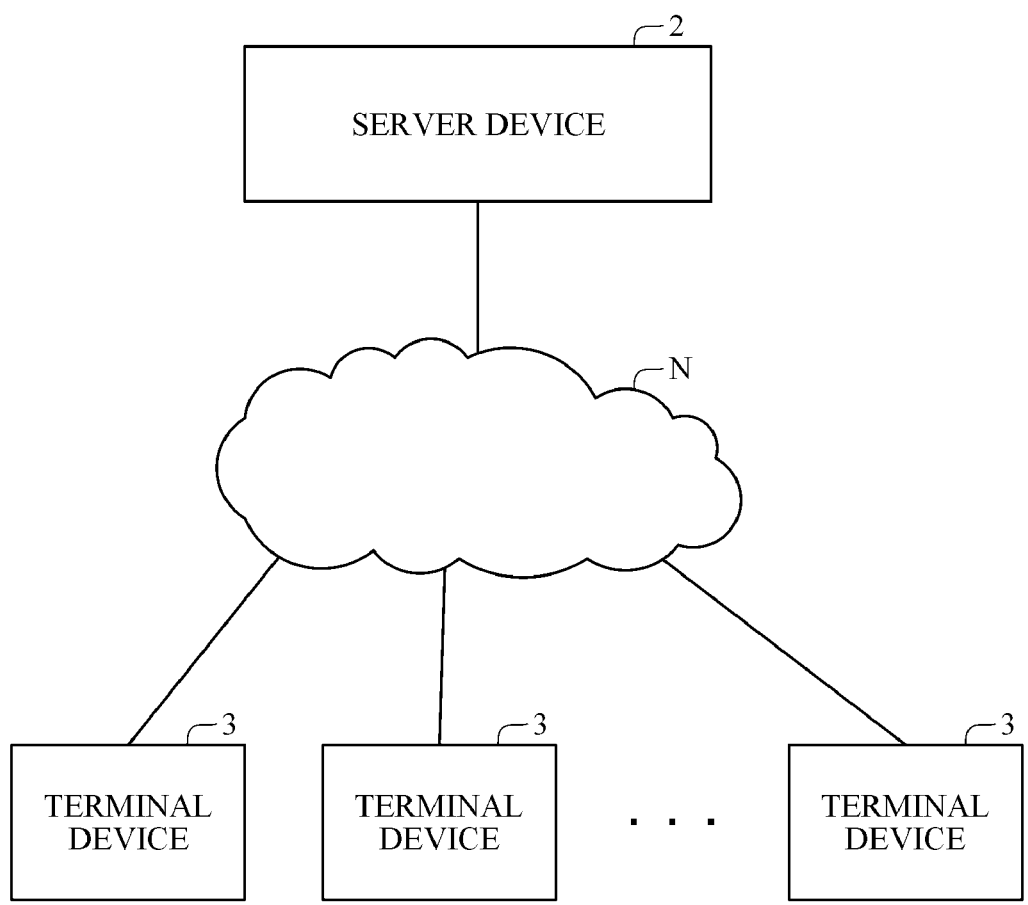
FIG. 1 is a block diagram showing an example of a whole configuration of a gaming system according to a first example embodiment of the present invention.
Figure 2:
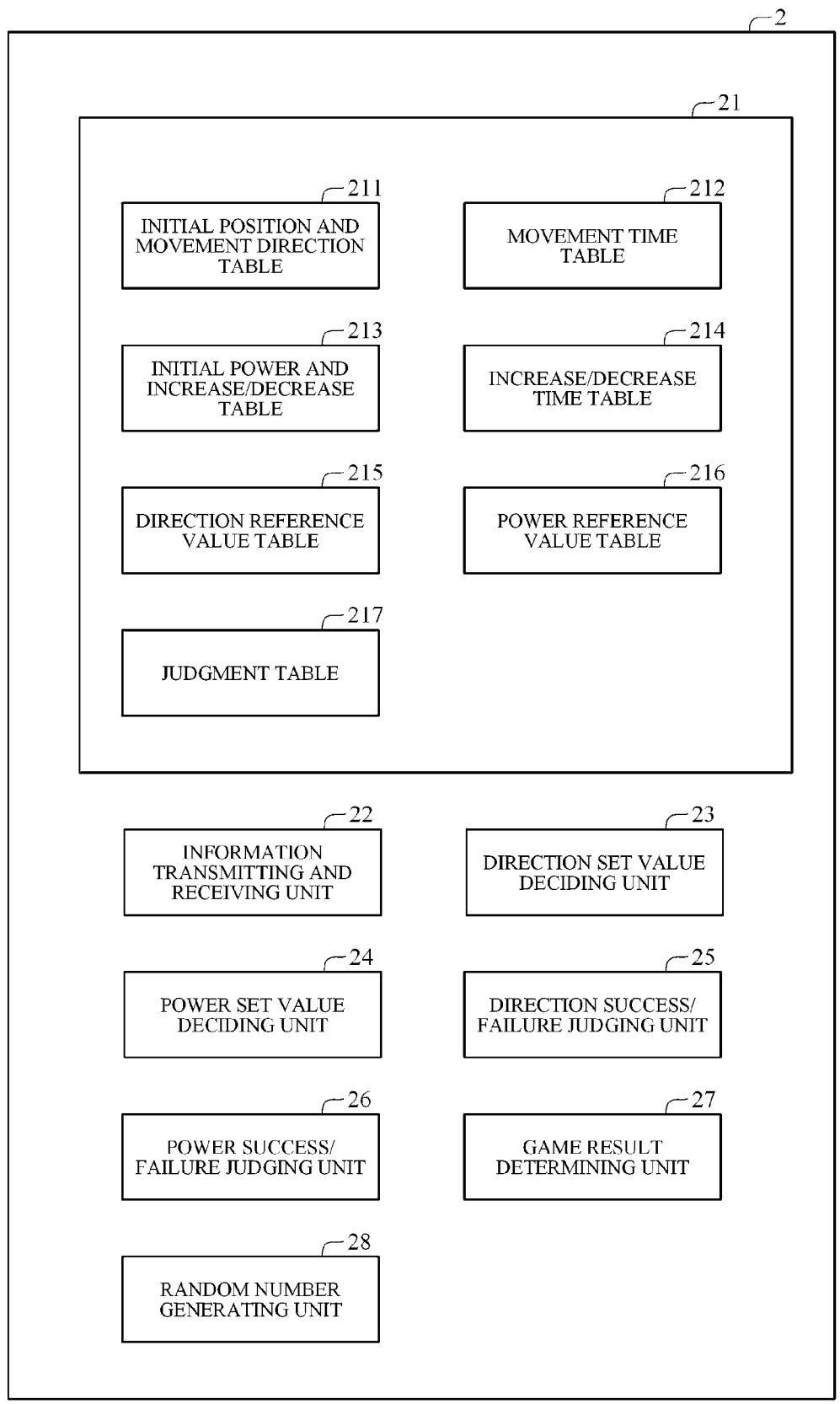
FIG. 2 is a block diagram showing an example of a configuration of a server device shown in FIG. 1.
Figure 3:
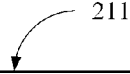
FIG. 3 is a view showing an example of a configuration an initial position and movement direction table shown in FIG. 2.
Figure 4:
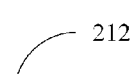
FIG. 4 is a view showing an example of a configuration of a movement time table shown in FIG. 2.
Figure 5:
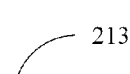
FIG. 5 is a view showing an example of a configuration of an initial power and increase/decrease table shown in FIG. 2.
Figure 6:
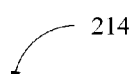
FIG. 6 is a view showing an example of a configuration of an increase/decrease time table shown in FIG. 2.
Figure 9:
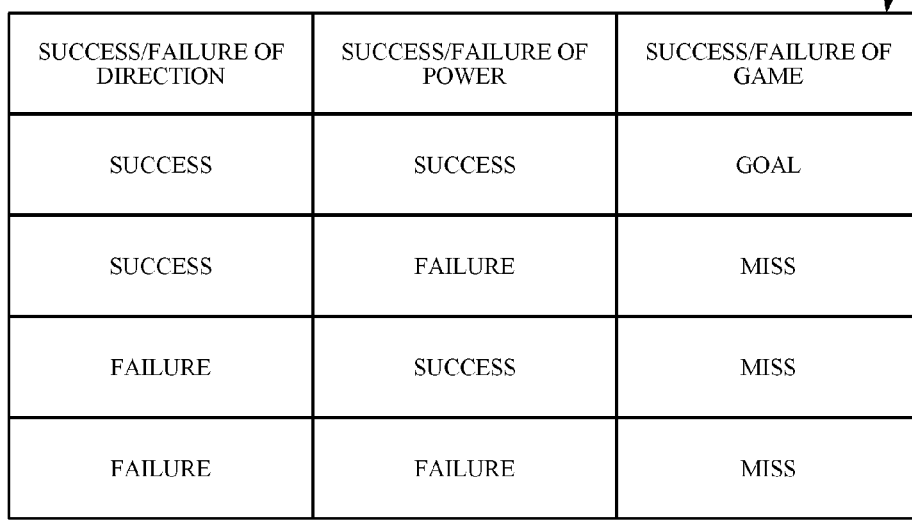
FIG. 9 is a view showing an example of a configuration of a judgment table shown in FIG. 2.
Figure 10:
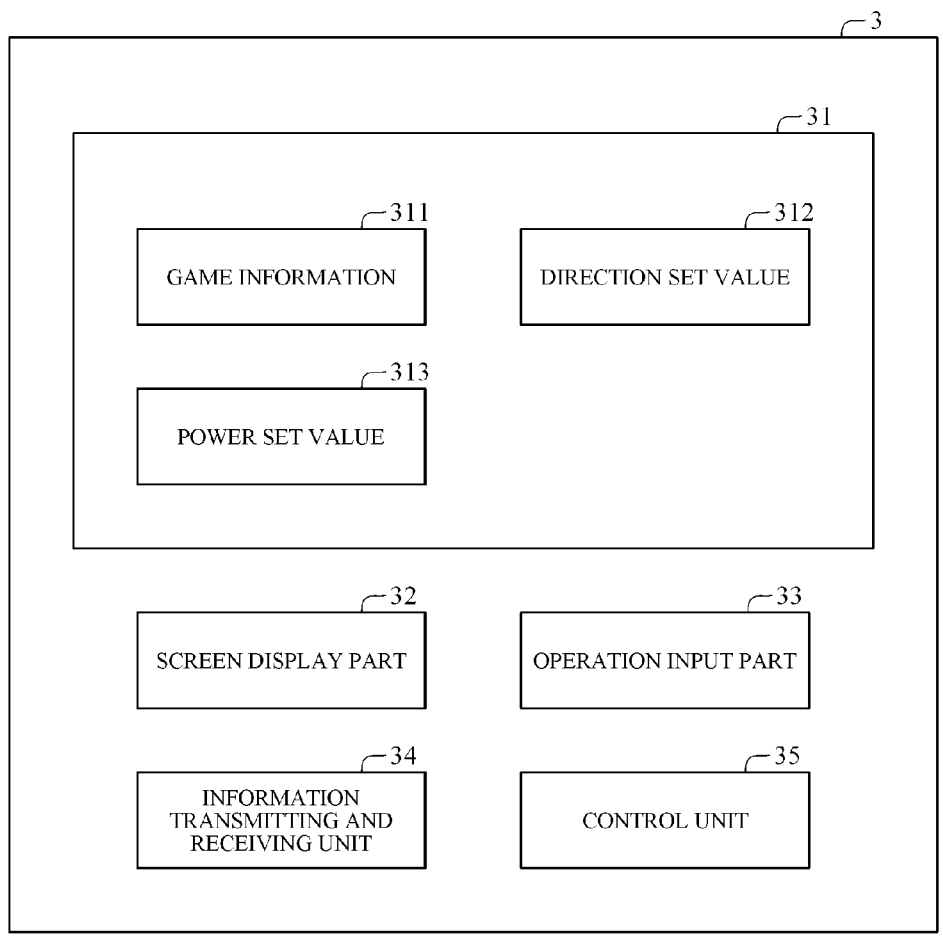
FIG. 10 is a block diagram showing an example of a configuration of a terminal device shown in FIG. 1.
Figure 13:
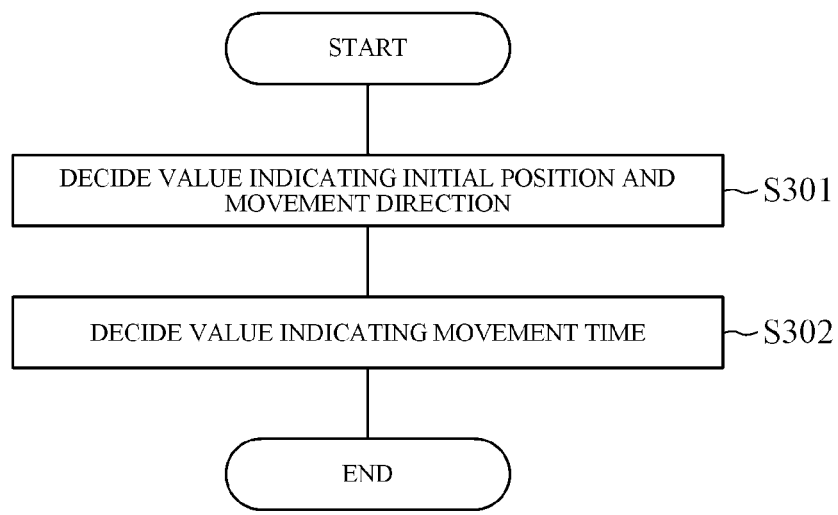
FIG. 13 is a flowchart showing an example of a process at the time of deciding a direction decision set value.
Figure 14:
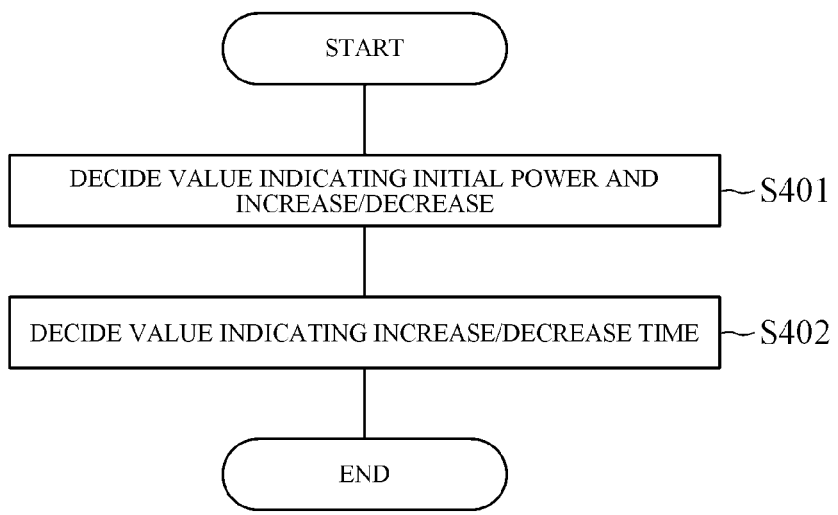
FIG. 14 is a flowchart showing an example of a process at the time of deciding a power decision set value.
Figure 15:
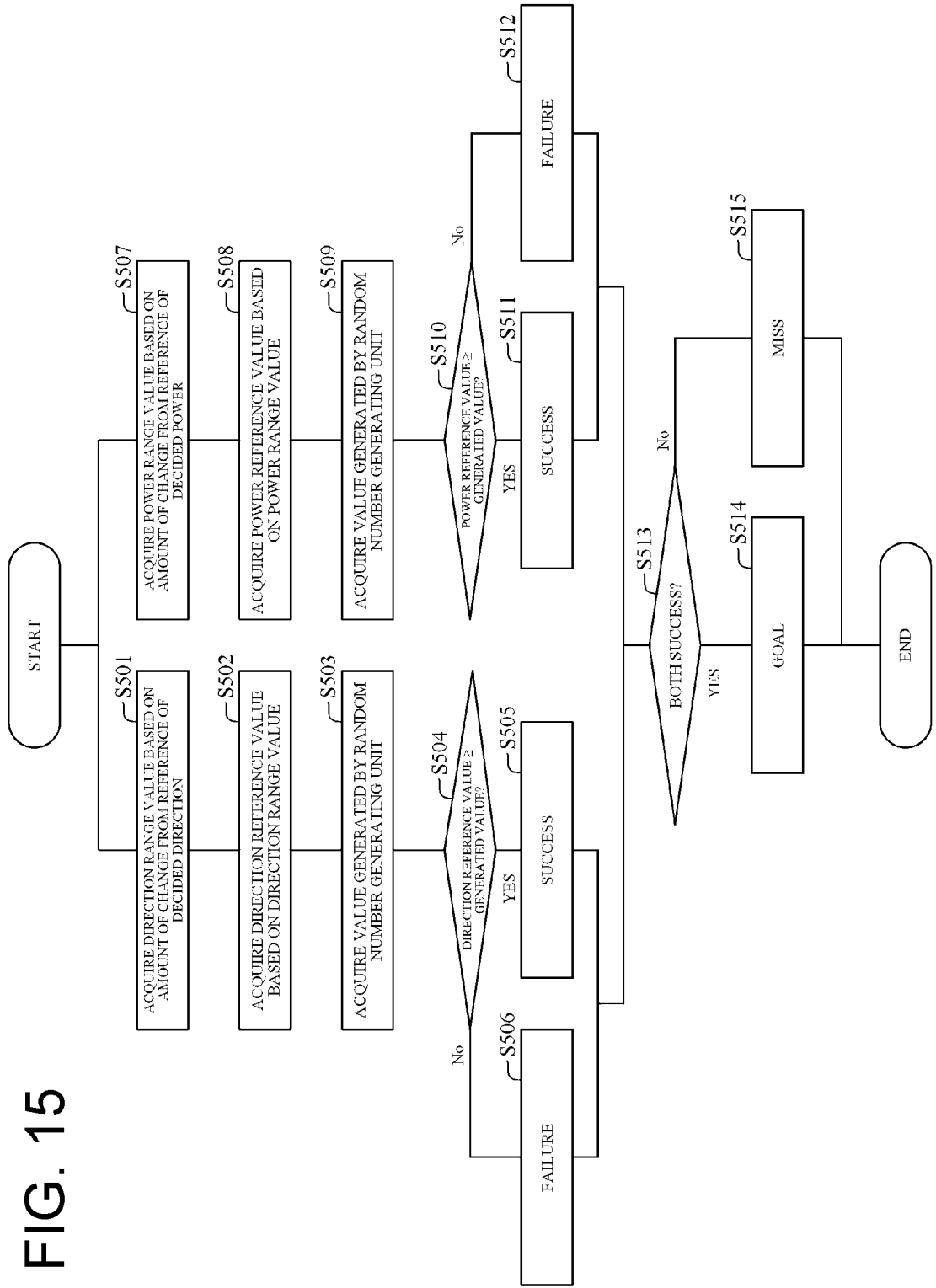
FIG. 15 is a flowchart showing an example of a process at the time of performing success/failure determination.
Figure 16:
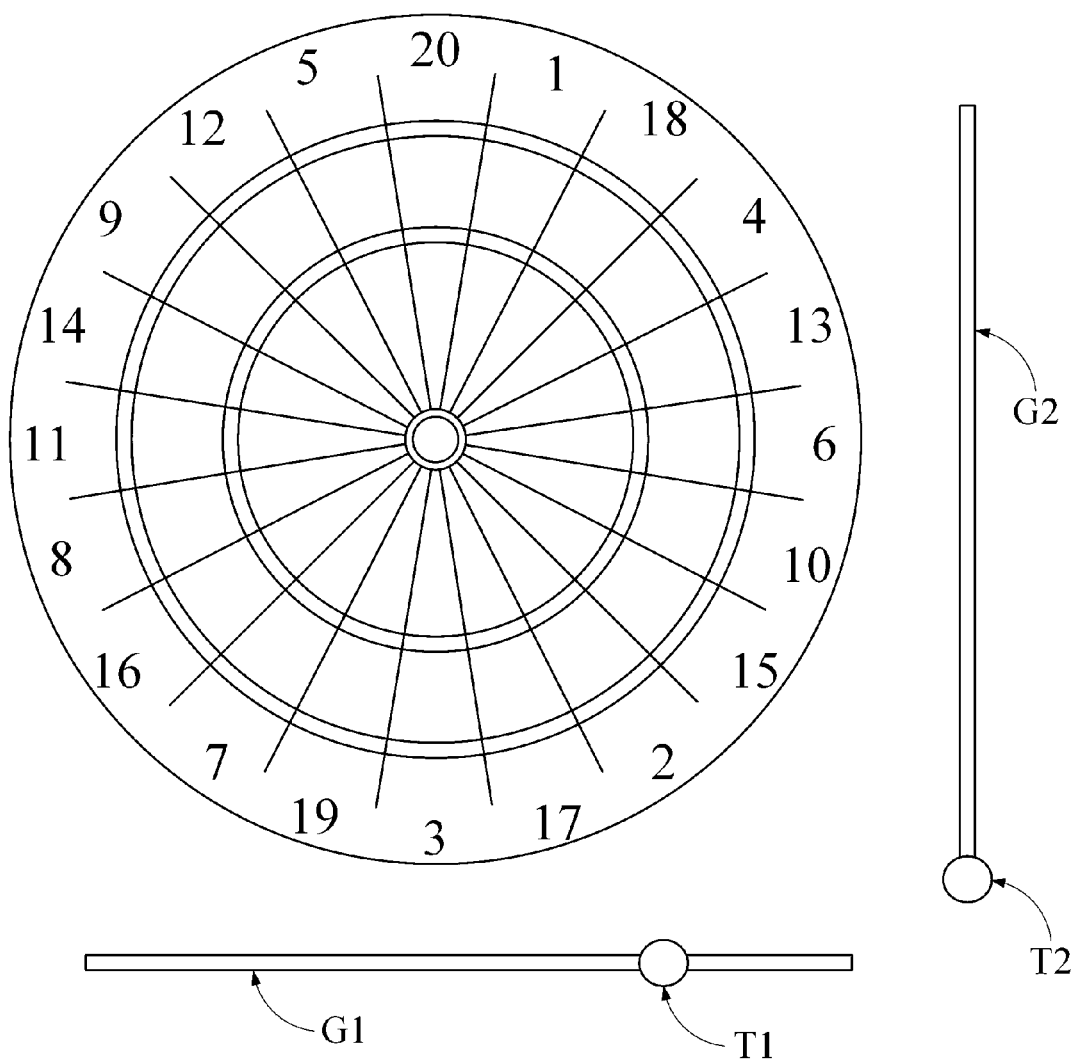
FIG. 16 is a view showing an example of another gaming system to which the present invention can be applied.
Figure 17:
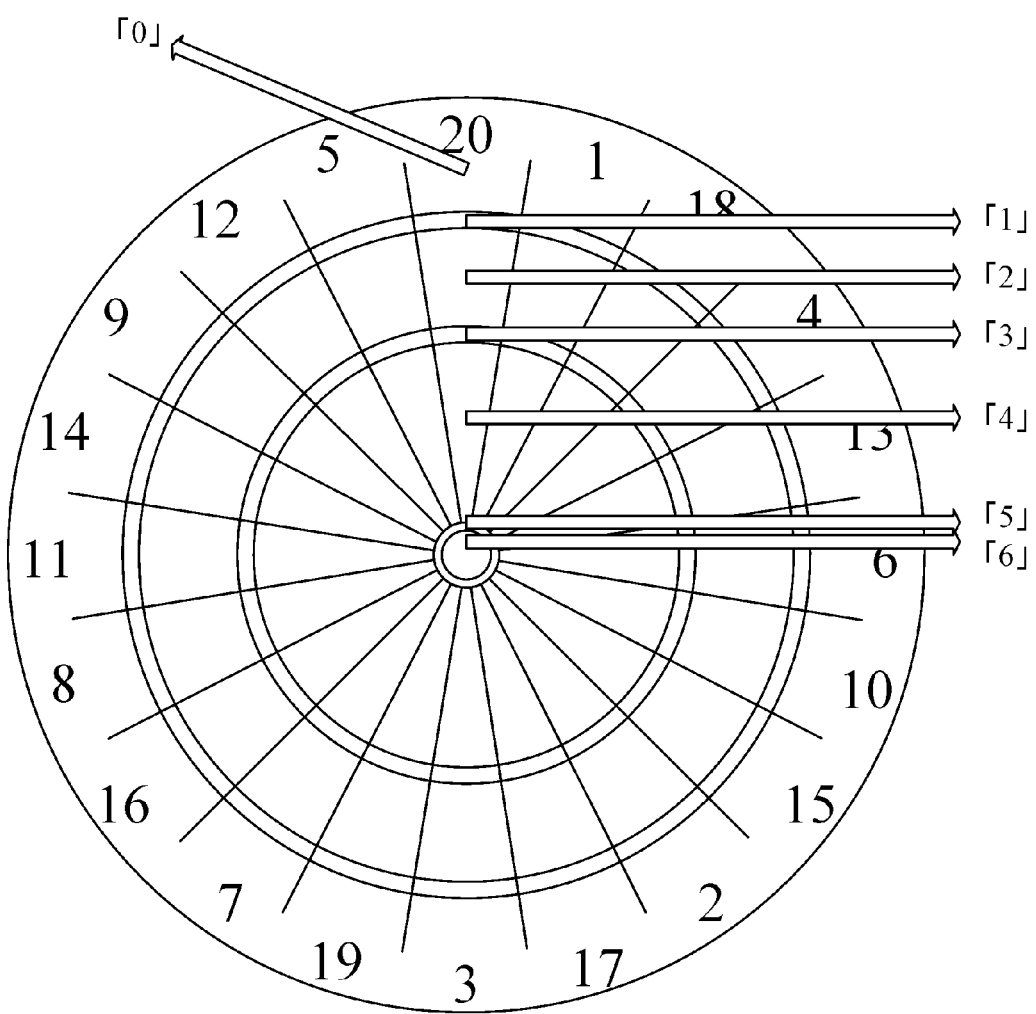
FIG. 17 is a view for describing an example of the other gaming system to which the present invention can be applied.
Figures 18, 19:
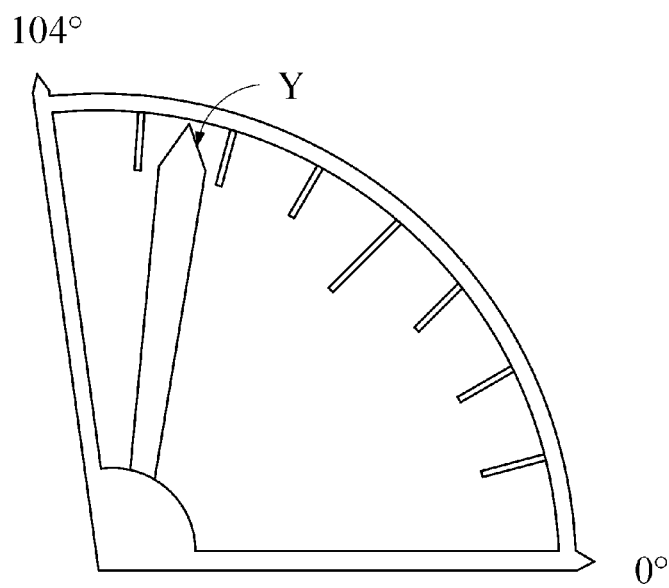
FIG. 18 is a view showing an example of a table used at the time of calculating a point in the other gaming system to which the present invention can be applied.
FIG. 19 is a view showing an example of another gaming system to which the present invention can be applied.

A first example embodiment of the present invention will be described with reference to FIGS. 1 to 22. FIG. 1 is a block diagram showing an example of a whole configuration of a gaming system 1. FIG. 2 is a block diagram showing an example of a configuration of a server device 2. FIG. 3 is a view showing an example of a configuration of an initial position and movement direction table 211. FIG. 4 is a view showing an example of a configuration of a movement time table 212. FIG. 5 is a view showing an example of a configuration of an initial power and increase/decrease table 213. FIG. 6 is a view showing an example of a configuration of an increase/decrease time table 214. FIG. 7 is a view showing an example of a configuration of a direction reference value table 215. FIG. 8 is a view showing an example of a configuration of a power reference value table 216. FIG. 9 is a view showing an example of a configuration of a judgment table 217. FIG. 10 is a block view showing an example of a configuration of a terminal device 3. FIG. 11 is a view showing an example of a movement of an arrow as a display object. FIG. 12 is a flowchart showing an example of an operation of the whole gaming system 1. FIG. 13 is a flowchart showing an example of a process at the time of deciding a direction decision set value. FIG. 14 is a flowchart showing an example of a process at the time of deciding a power decision set value. FIG. 15 is a flowchart showing an example of a process at the time of performing success/failure determination. FIG. 16 is a view showing an example of another gaming system to which the present invention can be applied. FIG. 17 is a view for describing an example of the other gaming system to which the present invention can be applied. FIG. 18 is a view showing an example of a table used at the time of calculating a point in the other gaming system to which the present invention can be applied. FIG. 19 is a view showing an example of the other gaming system to which the present invention can be applied. FIG. 20 is a view showing an example of a table used in the other gaming system to which the present invention can be applied. FIG. 21 is a view showing an example of a table used at the time of determining the result of a game in the other gaming system to which the present invention can be applied. FIG. 22 is a view showing an example of a table used at the time of determining the result of a game in the other gaming system to which the present invention can be applied.

In the first example embodiment of the present invention, a gaming system 1 will be described. The gaming system 1, in a game of virtually taking a football penalty kick, uses a value generated by a random number generating unit 28 (RNG: Random Number Generator) when determining a game result that is determination whether a goal is scored or not. As will be described later, when determining a game result, the gaming system 1 according to this example embodiment uses, in addition to a value generated by the random number generating unit 28, a value based on the state of an arrow (for example, the direction or length of the arrow) that serves as a display object displayed on a screen display part 32 of a terminal device 3 and that is determined by accepting an input from the user while the arrow is performing a given movement. Such a configuration of the gaming system 1 makes it possible to, for example, reflect the result of the user's operation onto a game result in a gambling game or the like. Herein, the arrow indicates, for example, the direction, power and so on of virtually kicking a ball. Therefore, the above can be shortly said that the gaming system 1 determines the result of a game on the basis of a random number generated by the random number generating unit 28 and a user's decision value indicating the direction, power and so on of kicking a ball decided with the user's operation.

FIG. 1 shows an example of a whole configuration of the gaming system 1. With reference to FIG. 1, the gaming system 1 includes a server device 2 and a plurality of terminal devices 3. For example, the server device 2 and the terminal devices 3 are connected so as to be able to communicate with each other via a network N.

The number of the server devices 2 and the number of the terminal device 3 are not limited to those shown in FIG. 1. For example, the gaming system 1 may have a plurality of server devices 2 and may have only one terminal device 3.

The server device 2 is an information processing device that, in a virtual penalty kick game played in the gaming system 1, executes a process to influence a game content and a process to determine a game result, such as decision of a direction set value and a power set value, direction success/failure determination and power success/failure determination, and determination of a game result.

FIG. 2 shows an example of a configuration of the server device 2. With reference to FIG. 2, the server device 2 has a storage part 21, an information transmitting and receiving unit 22, a direction set value deciding unit 23, a power set value deciding unit 24, a direction success/failure judging unit 25 (one of a determining unit), a power success/failure judging unit 26 (one of the determining unit), a game result determining unit 27 (one of the determining unit), and a random number generating unit 28. The server device 2 may have a screen display part, an operation input part and so on, which are not shown in the drawings. The server device 2 has an arithmetic device like a processor (not shown in the drawings) and a storage device (not shown in the drawings) (or the storage part 21) and realizes the processing units described above by execution of a program stored in the storage device by the arithmetic device.

The storage part 21 is a storage device including a main storage device such as a RAM (Random Access Memory) and an auxiliary storage device such as a nonvolatile semiconductor memory and a hard disk. In the storage part 21, for example, an initial position and movement direction table 211, a movement time table 212, an initial power and increase/decrease table 213, an increase/decrease time table 214, a direction reference value table 215, a power reference value table 216, a judgment table 217 and so on are stored.

The initial position and movement direction table 211 is a table showing an initial position and a direction. The initial position is a position that an arrow serving as a display object is first displayed on the screen display part 32 (an arrow initial state). The direction is a direction that the arrow displayed on the screen display part 32 first rotates (an arrow change direction). As will be described later, the direction set value deciding unit 23 decides a value indicating an arrow initial position and an arrow movement direction with reference to the initial position and movement direction table 211.

FIG. 3 shows an example of a configuration of the initial position and movement direction table 211. With reference to FIG. 3, for example, an identification number, an initial position and a movement direction are associated with each other in the initial position and movement direction table 211. To be specific, for example, identification number "1," initial position "−60 degrees" and movement direction "from left to right" are associated with each other in the initial position and movement direction table 211. Moreover, for example, identification number "4," initial position "60 degrees" and movement direction "from right to left" are associated with each other in the initial position and movement direction table 211. In a case where an identification number indicated by a value decided by the direction set value deciding unit 23 is "1," the initial position of an arrow is "−160 degrees" and the arrow first rotates "from left to right." In other words, in a case where an identification number is "1," an arrow displayed at a position of "−60 degrees" spends a given time rotating to a position of "60 degrees." After that, the arrow spends a given time rotating from the position of "60 degrees" to the position of "−60 degrees." After rotating to the position of "−60 degrees," the arrow starts rotating to the position of "60 degrees" again. The arrow repeats such a reciprocation movement, for example. Moreover, in a case where an identification number indicated by a value decided by the direction set value deciding unit 23 is "4," the initial position of an arrow is "60 degrees" and the arrow first rotates "from right to left." In other words, in a case where an identification number is "4," an arrow displayed at a position of "60 degrees" spends a given time rotating to a position of "−60 degrees." After that, the arrow spends a given time rotating from the position of "−60 degrees" to the position of "60 degrees."

After rotating to the position of "60 degrees," the arrow starts rotating to the position of "−60 degrees" again. The arrow repeats such a reciprocation movement, for example.

The movement time table 212 is a table showing a movement time. A movement time is a time taken for an arrow serving as a display object to continuously rotate from one end to another end (i.e., the table shows a value used when the arrow rotates). As will be described later, the direction set value deciding unit 23 decides a value indicating an arrow movement time by referring to the movement time table 212.

FIG. 4 shows an example of a configuration of the movement time table 212. With reference to FIG. 4, for example, an identification number and a movement time are associated with each other in the movement time table 212. To be specific, for example, identification number "1" and movement time "0.5" are associated with each other in the movement time table 212. In a case where an identification number indicated by a value decided by the direction set value deciding unit 23 is "1," an arrow displayed on the screen display part 32 spends 0.5 seconds rotating from one end to another end (from a left end, namely, −60 degrees to a right end, namely, 60 degrees; or from the right end, namely, 60 degrees to the left end, namely, −60 degrees).

An identification number and a movement time are associated with each other in the movement time table 212 as described above. However, instead of a movement time, a movement speed indicating a speed of rotation of an arrow may be associated with an identification number in the movement time table 212. That is, instead of the movement time table 212, a movement speed table in which an identification number is associated with a movement speed may be stored in the storage part 21.

The initial power and increase/decrease table 213 is a table showing an initial power and increase/decrease. An initial power is the original strength of a power represented by the length of an arrow serving as a display target (i.e., the length of an arrow first displayed on the screen display part 32, the initial state of the arrow). Increase/decrease is a direction of first change of a power represented by extension and contraction of the arrow (i.e., the direction of change of the arrow). As will be described later, the power set value deciding unit 24 refers to the initial power and increase/decrease table 213 to decide a value indicating the strength of an initial power and the direction of change of the power (increase/decrease).

FIG. 5 shows an example of a configuration of the initial power and increase/decrease table 213. With reference to FIG. 5, for example, an identification number, an initial power and increase/decrease are associated with each other in the initial power and increase/decrease table 213. To be specific, for example, identification number "1," initial power "0.04" and increase/decrease "increase" are associated with each other in the initial power and increase/decrease table 213. Moreover, for example, identification number "2," initial power "0.5" and increase/decrease "decrease" are associated with each other in the initial power and increase/decrease table 213. In a case where an identification number indicated by a value decided by the power set value deciding unit 24 is "1," an initial power is "0.04" and the power first changes in an increasing direction. In other words, in a case where an identification number is "1," the length of the arrow spends a given time extending from a state of initial power "0.04" with the shortest arrow length to a state of power "1" with the longest arrow length. After that, the arrow spends a given time contracting from the state of power "1" with the longest length to the state of power "0.04" with the shortest length." After contracting to the state of power "0.04," the arrow extends to the state of power "1" again. The arrow repeats such a reciprocation movement, for example. Moreover, in a case where an identification number indicated by a value decided by the power set value deciding unit 24 is "2," an initial power is "0.5" and the power first changes in a decreasing direction. In other words, in a case where the identification number is "2," the arrow spends half of the given time contracting its length from a state of power "0.5" to the state of power "0.04" with the shortest arrow length. After that, the arrow spends the given time extending from the power "0.04" state to the power "1" state. Then, after extending to the power "1" state, the arrow contracts again to the power "0.04" state. The arrow repeats such a reciprocation movement, for example.

The increase/decrease time table 214 is a table showing an increase/decrease time, which is a time taken for a power to continuously change from one end to another end (i.e., a time taken for an arrow in the shortest state to be brought into the longest state, or a time taken for an arrow in the longest state to be brought into the shortest state) (i.e., the table shows a value used when an arrow performs a given movement). As will be described later, the power set value deciding unit 24 decides a value indicating a time taken for a power to change (an increase/decrease time) by referring to the increase/decrease time table 214.

FIG. 6 shows an example of a configuration of the increase/decrease time table 214. With reference to FIG. 6, for example, an identification number and an increase/decrease time indicating a time taken for an arrow to change are associated with each other in the increase/decrease time table 214. To be specific, for example, identification number "1" and increase/decrease time "0.5 s" are associated with each other in the increase/decrease time table 214. In a case where an identification number indicated by a value decided by the power set value deciding unit 24 is "1," the arrow spends 0.5 seconds changing from one end to another end (from a power "1" state as the longest state to a power "0.04" state as the shortest state, or from the power "0.04" state to the power "1" state). That is, in a case where an identification number is "1," an arrow spends 0.5 seconds changing from the longest state to the shortest state, or from the shortest state to the longest state.

An identification number and an increase/decrease time are associated with each other in the increase/decrease time table 214 as described above. However, instead of an increase/decrease time, an increase/decrease speed indicating a speed of change of an arrow may be associated with an identification number in the increase/decrease time table 214. That is, instead of the increase/decrease time table 214, an increase/decrease speed table in which an identification number is associated with an increase/decrease speed may be stored in the storage part 21.

The direction reference value table 215 is a table (a correspondence table) showing an association between a direction range value (a range value) and a direction reference value (a reference value). The direction range value is a range to which a value indicating a direction decided by the user's operation belongs. The direction reference value is compared with a value generated by the random number generating unit 28. As will be described later, when performing first determination, namely, direction success/failure determination, the direction success/failure judging unit 25 acquires a direction reference value by referring to the direction reference value table 215 and compares the acquired direction reference value with a value generated by the random number generation unit 28.

FIG. 7 shows an example of the configuration of the direction reference value table 215. With reference to FIG. 7, in the direction reference value table 215, an identification number, a direction range value and a direction reference value are associated with each other. To be specific, for example, in the direction reference value table 215, identification number "1," direction range value "0≤A<0.1" and direction reference value "50" are associated with each other.

As shown in FIG. 7, in the direction reference value table 215, direction reference values corresponding to direction range values on both the ends (that is, "0≤A<0.1" and "0.9≤A<1") are the lowest values. Moreover, direction reference values corresponding to direction range values in the middle (that is, "0.4≤A<0.5" and "0.5≤A<0.6") are the second lowest values. Thus, in the direction reference value table 215, low values are on both the ends and in the middle. Moreover, the direction reference value table 215 is formed so that a direction reference value is higher at an outer position except on both the ends and in the middle. In other words, the direction reference value table 215 is formed so that a direction range value corresponding to the lowest reference value is adjacent to a direction range value corresponding to the highest direction reference value.

The power reference value table 216 is a table (a correspondence table) showing a correspondence between a power range value (a range value) that is a range to which a value showing a power decided by the user's operation belongs and a power reference value (a reference value) compared with a value generated by the random number generating unit 28. As will be described later, when performing second determination, namely, power success/failure determination, the power success/failure judging unit 26 acquires a power reference value by referring to the power reference value table 216 and compares the acquired power reference value with a value generated by the random number generating unit 28.

FIG. 8 shows an example of the configuration of the power reference value table 216. With reference to FIG. 8, in the power reference value table 216, an identification number, a power range value and a power reference value are associated with each other. To be specific, for example, in the power reference value table 216, identification number "1," power range value "0≤B<0.1" and power reference value "50" are associated with each other.

As shown in FIG. 8, the power reference value table 216 has the same property as the direction reference value table 215 shown in FIG. 7. That is, the power reference value table 216 is formed so that low values are on both the ends and in the middle and a power reference value is higher at an outer position except on both the ends and in the middle. Moreover, the power reference value table 216 is formed so that a power range value corresponding to the lowest power reference value is adjacent to a power range value corresponding to the highest power reference value. Meanwhile, the property of the power reference value table 216 may be different from that of the direction reference value table 215.

The judgment table 217 is a table showing a correspondence between success/failure of a direction, namely, a first determination result by the success/failure judging unit 25, success/failure of a power, namely, a second determination result by the power success/failure judging unit 26, and success/failure of a game used at the time of determining a game result that is determination whether a goal is scored or not. As will be described later, the game result determining unit 27 refers to the judgment table 217 at the time of determining a game result.

FIG. 9 shows an example of the configuration of the judgment table 217. With reference to FIG. 9, in the judgment table 217, success/failure of a direction, success/failure of a power, and success/failure of a game are associated with each other. To be specific, for example, in the judgment table 217, direction success/failure "success," power success/failure "success" and game success/failure "goal" are associated with each other. Moreover, in the judgment table 217: direction success/failure "success," power success/failure "failure" and game success/failure "miss" are associated with each other; and direction success/failure "failure," power success/failure "success" and game success/failure "miss" are associated with each other.

The information transmitting and receiving unit 22 transmits and receives various information to and from the terminal device 3 connected via the network N. Information transmitted to the terminal device 3 via the information transmitting and receiving unit 22 is, for example, a direction set value decided by the direction set value deciding unit 23, a power set value decided by the power set value deciding unit 24, information showing a game result determined by the game result determining unit 27, and so on. Information received from the terminal device 3 via the information transmitting and receiving unit 22 is, for example, notification showing that a "shoot" button has been pressed (first time, second time), information showing a direction decided by the user's operation, information showing a power, and so on.

The direction set value deciding unit 23 decides a direction set value by referring to the initial position and movement direction table 211, the movement time table 212, and so on. Then, the direction set value deciding unit 23 transmits the decided direction set value to the terminal device 3 via the information transmitting and receiving unit 22.

For example, the direction set value deciding unit 23 receives notification showing that a "shoot" button serving as a trigger to start a virtual penalty kick game has been pressed on the terminal device 3 (first notification) from the terminal device 3 via the information transmitting and receiving unit 22. The direction set value deciding unit 23 then randomly decides on any value among values of 1 to 4 corresponding to the identification numbers included by the initial position and movement direction table 211. Then, the direction set value deciding unit 23 decides on an initial position and a movement direction that are associated with the identification number indicated by the decided value by referring to the initial position and movement direction table 211.

Further, the direction set value deciding unit 23 randomly decides on any value among values of 1 to 4 corresponding to the identification numbers included by the movement time table 212. The direction set value deciding unit 23 may decide on the same value as when deciding on a value corresponding to an identification number included by the initial position and movement direction table 211 or may decide on a different value. Then, the direction set value deciding unit 23 decides on a movement time associated with the identification number indicated by the decided value by referring to the movement time table 212. After that, the direction set value deciding unit 23 transmits a direction set value indicating the decided initial position, movement direction and movement time to the terminal device 3 via the information transmitting and receiving unit 22.

The direction set value deciding unit 23, for example, randomly decides a value by using the random number generating unit 28. For example, when a need to randomly decide a value occurs, the direction set value deciding unit 23 instructs the random number generating unit 28 to randomly decide on any value among values of 1 to 4. In response to this, the random number generating unit 28 randomly decides on any value among values of 1 to 4. The direction set value deciding unit 23 can use a thus decided value, for example.

The power set value deciding unit 24 decides a power set value by referring to the initial power and increase/decrease table 213, the increase/decrease time table 214, and so on. Then, the power set value deciding unit 24 transmits the decided power set value to the terminal device 3 via the information transmitting and receiving unit 22.

For example, the power set value deciding unit 24 receives notification showing that the "shoot button" has been pressed for the second time on the terminal device 3 (second notification) from the terminal device 3 via the information transmitting and receiving unit 22. The power set value deciding unit 24 then randomly decides on any value among values of 1 to 4 corresponding to the identification numbers included by the initial power and increase/decrease table 213. Then, the power set value deciding unit 24 decides on initial power and increase/decrease associated with the identification number indicated by the decided value by referring to the initial power and increase/decrease table 213.

Further, the power set value deciding unit 24 randomly decides on any value among the values of 1 to 4 corresponding to the identification numbers included by the increase/decrease time table 214. The power set value deciding unit 24 may decide on the same value as when deciding on a value corresponding to the identification number included by the initial power and increase/decrease table 213 or may decide on a different value. Then, the power set value deciding unit 24 decides on an increase/decrease time associated with the identification number indicated by the decided value by referring to the increase/decrease time table 214. After that, the power set value deciding unit 24 transmits a power set value indicating the decided initial power, increase/decrease and increase/decrease time to the terminal device 3 via the information transmitting and receiving unit 22.

Meanwhile, the power set value deciding unit 24, for example, randomly decides a value by using the random number generating unit 28. For example, when a need to randomly decide a value occurs, the power set value deciding unit 24 instructs the random number generating unit 28 to randomly decide on any value among the values of 1 to 4. In response to this, the random number generating unit 28 randomly decides on any value among the values of 1 to 4. The power set value deciding unit 24 can use a thus decided value, for example.

The direction success/failure judging unit 25 performs first determination, namely, direction success/failure determination on the basis of a value indicating a direction decided by the user's operation and a value generated by the random number generating unit 28. Then, the direction success/failure judging unit 25 notifies the result of determination of direction success/failure to the game result determining unit 217.

For example, the direction success/failure judging unit 25 receives information showing a direction decided by the user's operation from the terminal device 3 via the information transmitting and receiving unit 22. Information showing a direction shows the state of an arrow serving as a display object when a "stop" button is operated by the user. For example, it shows in which direction an arrow displayed on the screen display part 32 of the terminal device 3 to be described later points between −60 degrees and 60 degrees when the "stop" button is operated by the user.

Upon receiving the information showing the direction, the direction success/failure judging unit 25 calculates a value indicating what degrees a direction decided by the user inclines from −60 degrees toward 60 degrees (a change amount), for example, on the basis of the following equation 1.

$$A=\alpha/120 \quad (1)$$

Herein, A denotes a value of a calculation object, and a denotes an inclination angle from −60 degrees toward 60 degrees. For example, in a case where the direction of an arrow is −30 degrees, the arrow is inclined 30 degrees from −60 degrees toward 60 degrees. Therefore, the value of a is 30. In the same manner, in a case where the direction of an arrow is 15 degrees, the value of $\alpha$ is 75.

Subsequently, the direction success/failure judging unit 25 refers to the direction reference value table 215 and checks to which range the value A corresponding to the position of the arrow belongs in a case where a whole range in which the arrow can move is divided into predetermined given ranges. In other words, the direction success/failure judging unit 25 calculates a value indicating the state of the arrow decided by the user's operation and, on the basis of the calculated value and the direction reference value table 215, acquires a direction range value indicating in which range a position (an angle) of the arrow that is the state of the arrow is included in a whole rotation movement of the arrow that is a given movement. Then, on the basis of the direction reference value table 215, the direction success/failure judging unit 25 acquires a direction reference value corresponding to the range to which the calculated value A belongs. For example, in a case where the direction success/failure judging unit 25 finds "0.25" as the value A, the direction success/failure judging unit 25 considers that the value A is in a range "equal to or more than 0.2, and less than 0.3" and acquires a direction reference value "80" corresponding to the range.

After that, the direction success/failure judging unit 25 performs the first determination, namely, the direction success/failure determination on the basis of the acquired direction reference value and a value generated by the random number generating unit 28. For example, the direction success/failure judging unit 25 checks whether or not the acquired direction reference value is equal to or more than the value generated by the random number generating unit 28. In a case where the acquired direction reference value is equal to or more than the value generated by the random number generating unit 28, the direction success/failure judging unit 25 determines that the first determination, namely, the direction success/failure determination is "success." On the other hand, in a case where the acquired direction reference value is less than the value generated by the random number generating unit 28, the direction success/failure judging unit 25 determines that the first determination, namely, the direction success/failure determination is "failure." Then, the direction success/failure judging unit 25 notifies information showing the result of the determination to the game result determining unit 27.

In this example embodiment, a timing when the direction success/failure judging unit 25 acquires a value generated by the random number generating unit 28 is not specifically limited. For example, the direction success/failure judging unit 25, by using acquisition of a direction reference value (or reception of information showing a direction) as a trigger, instructs the random number generating unit 28 to generate a random number and acquires the value from the random number generating unit 28. The direction success/failure judging unit 25 may acquire a value from the random number generating unit 28 by a method other than that exemplified above.

The power success/failure judging unit 26 performs second determination, namely, power success/failure determination on the basis of a value indicating a power decided by the user's operation and a value generated by the random number generating unit 28. Then, the power success/failure judging unit 26 notifies the result of determination of success/failure of a power to the game result determining unit 27.

For example, the power success/failure judging unit 26 receives information showing a power decided by the user's operation from the terminal device 3 via the information transmitting and receiving unit 22. Information showing a power shows the state of an arrow serving as a display object when the user operates the "stop" button. For example, it shows a power based on the length of the arrow displayed on the screen display part 32 of the terminal device 3 to be described later when the user operates the "stop" button. For example, the minimum value of a power is "0.04" and the maximum value is "1." Moreover, a power is a value which becomes larger as the length of an arrow becomes longer. Meanwhile, information showing a power may show the length of an arrow. In this case, the power success/failure judging unit 26 calculates a power on the basis of the length of an arrow.

Upon receiving the information showing the power, the power success/failure judging unit 26 calculates a value indicating what extent a power decided by the user is larger than the least power "0.04" (a change amount), for example, on the basis of the following equation 2.

$$B=(\beta-0.04)/0.96 \quad (2)$$

Herein, B denotes a value of a calculation object, and 13 denotes a power corresponding to the length of an arrow displayed on the screen display part 32 of the terminal device 3 when the user operates the "stop" button. For example, in a case where the length of the arrow is the shortest in a predetermined range, the power is "0.04." Moreover, for example, in a case where the length of the arrow is the longest in the predetermined range, the power is "1."

Subsequently, the power success/failure judging unit 26 refers to the power reference value table 216 and checks to which range the value B corresponding to the length of the arrow belongs in a case where a whole range in which the arrow can extend/contract is divided into predetermined given ranges. In other words, the power success/failure judging unit 26 calculates a value indicating the state of the arrow decided by the user's operation and, on the basis of the calculated value and the power reference value table 216, acquires a power range value indicating in which range the power based on the length of the arrow that is the state of the arrow is included in a whole expansion/contraction movement of the arrow that is a predetermined movement. Then, on the basis of the power reference value table 216, the power success/failure judging unit 26 acquires a power reference value corresponding to a range to which the calculated value B belongs. For example, in a case where the power success/failure judging unit 26 finds "0.45" as the value B, the power success/failure judging unit 26 considers that the value B is in a range "equal to or more than 0.4, and less than 0.5" and acquires a power reference value "60" corresponding to the range.

After that, the power success/failure judging unit 26 performs the second determination, namely, the power success/failure determination on the basis of the acquired power reference value and a value generated by the random number generating unit 28. For example, the power success/failure judging unit 26 checks whether or not the acquired power reference value is equal to or more than the value generated by the random number generating unit 28. In a case where the acquired power reference value is equal to or more than the value generated by the random number generating unit 28, the power success/failure judging unit 26 determines that the second determination, namely, the power success/failure determination is "success." On the other hand, in a case where the acquired power reference value is less than the value generated by the random number generating unit 28, the power success/failure judging unit 26 determines that the second determination, namely, the power success/failure determination is "failure." Then, the power success/failure judging unit 26 notifies the result of the determination to the game result determining unit 27.

In this example embodiment, a timing when the power success/failure judging unit 26 acquires a value generated by the random number generating unit 28 is not specifically limited.

For example, the power success/failure judging unit 26, by using acquisition of a power reference value (or reception of information showing a power) as a trigger, instructs the random number generating unit 28 to generate a random number and acquires the value from the random number generating unit 28. The power success/failure judging unit 26 may acquire the value from the random number generating unit 28 by a method other than that exemplified above. The value generated by the random number generating unit 28 used by the direction success/failure judging unit 25 and the value generated by the random number generating unit 28 used by the power success/failure judging unit 26 are, for example, values generated at different timings, but may be values generated at the same timing (the same values).

The game result determining unit 27 determines a game result that is determination whether a goal is scored or not in a game of taking a virtual penalty kick, on the basis of the result of the direction success/failure determination acquired from the direction success/failure judging unit 25, the result of the power success/failure determination acquired from the power success/failure judging unit 26, and the judgment table 217. Then, the game result determining unit 27 transmits information showing the game result that is the result of the determination to the terminal device 3 via the information transmitting and receiving unit 22.

For example, the game result determining unit 27 acquires the result of the direction success/failure determination from the direction success/failure judging unit 25. Moreover, the game result determining unit 27 acquires the result of the power success/failure determination from the power success/failure judging unit 26. Then, the game result determining unit 27 refers to the judgment table 217 and acquires the success/failure of the game corresponding to the result of the direction success/failure determination and the result of the power success/failure determination. For example, in a case where success/failure of a direction is "success" and success/failure of a power is "success," the game result determining unit 27 acquires "goal" as game success/failure. On the other hand, for example, in a case where either direction success/failure is "failure" or power success/failure is "failure," the game result determining unit 27 acquires "miss" as game success/failure. Then, the game result determining unit 27 transmits information showing a game result that is the result of the determination (information showing "goal" as game success/failure or "miss" as game success/failure) to the terminal device 3 via the information transmitting and receiving unit 22. The random number generating unit 28 randomly generates any number among values in a predetermined given range (for example, from 1 to 100, or from 1 to 4) in response to a request from the direction set value deciding unit 23, the power set value deciding unit 24, the direction success/failure judging unit 25, the power success/failure judging unit 26, or the like. Then, the random number generating unit 28 transmits the generated value to the request source (the direction set value deciding unit 23, the power set value deciding unit 24, the direction success/failure judging unit 25, the power success/failure judging unit 26). The random number generating unit 28, for example, uses a pseudo random number generating algorithm to generate the abovementioned value. The random number generating unit 28 may have a hardware random number generator such as a random number generation IC (Integrated Circuit) and utilize the result of generation by the hardware random number generator. In other words, the random number generating unit 28 may generate a value by using a pseudo random number generating algorithm or may generate a value by using a hardware random number generator. The random number generating unit 28 may use both the pseudo random number generating algorithm and the hardware random number generator.

The above is an example of the configuration of the server device 2. As described above, the server device 2 decides a direction set value, and decides a power set value. Moreover, the server device 2 performs determination of direction success/failure and determination of power success/failure, and also determines a game result.

The terminal device 3 is an information processing device or a gaming device operated by the user. The user plays a virtual penalty kick game by operating the terminal device 3.

FIG. 10 shows an example of the configuration of the terminal device 3. With reference to FIG. 10, the terminal device 3 has the storage part 31, the screen display part 32, the operation input part 33, the information transmitting and receiving unit 34 and a control unit 35 (a state deciding unit, a first state deciding unit, a second state deciding unit). The terminal device 3 has, for example, an arithmetic device like a processor (not shown in the drawings) and a storage device (not shown in the drawings) (or the storage part 31) and realizes the abovementioned processing units by execution of a program stored in the storage device by the arithmetic device.

The storage part 31 is a storage device including a main storage device such as a RAM and an auxiliary storage device such as a nonvolatile semiconductor memory. The storage part 31 may include an auxiliary storage device such as a hard disk. In the storage part 31, for example, game information 311, a direction set value 312, a power set value 313 and so on are stored.

The game information 311 is image information, a program and so on that are necessary when the virtual penalty kick game is played on the terminal device 3. As will be described later, the control unit 35 executes the virtual penalty kick game on the terminal device 3 by using the game information 311, the direction set value 312, the power set value 313 and so on.

The direction set value 312 indicates an initial position, a movement direction and a movement time that are decided by the direction set value deciding unit 23 of the server device 2. The power set value 312 is updated, for example, every time the penalty kick game is played. The direction set value 312 is used by the control unit 35.

The power set value 313 indicates an initial power, increase/decrease and an increase/decrease time that are decided by the power set value deciding unit 24 of the server device 2. The power set value 313 is updated, for example, every time the penalty kick game is played.

The power set value 313 is used by the control unit 35.

The screen display part 32 is, for example, a display screen such as a liquid crystal display and an organic EL display. On the screen display part 32, a game screen (an image necessary for virtually playing a penalty kick game, for example, a character that virtually kicks a ball, a goalkeeper and a background such as a goal; and also, an arrow serving as a display object used when defining the direction and power of the ball) is displayed in accordance with an instruction of the control unit 35. On the screen display part 32, information necessary for proceeding the game such as a "play" button, a "shoot" button and a "stop" button can also be displayed.

The operation input part 33 is, for example, a touch screen, a button, or the like. A user who plays a virtual penalty kick game by using the terminal device 3 operates the operation input part 33, thereby causing the arrow serving as a display object to perform a given movement (a rotation movement, an expansion/contraction movement) or stops the arrow performing the given movement (that is, decides the direction and power of a ball). The operation input part 33 may be configured to accept an input in accordance with a voice instruction, and may be a game controller, a mouse, a keyboard, or the like.

The information transmitting and receiving unit 34 transmits and receives various information to and from the server device 2 connected via the network N. Information transmitted to the server device 2 via the information transmitting and receiving unit 34 is, for example, notification showing that the "shoot" button has been pressed (first time, second time), information showing a direction and power decided by the user's operation, and so on. Information received from the server device 2 via the information transmitting and receiving unit 34 is, for example, a direction set value decided by the direction set value deciding unit 23, a power set value decided by the power set value deciding unit 24, and information showing a game result determined by the game result determining unit 27.

The control unit 35 controls a whole game. Moreover, the control unit 35 in this example embodiment has a function as a first state deciding unit that decides the direction of the arrow in accordance with the user's operation, and a function as a second state deciding unit that decides the length of the arrow (a power corresponding to the length) in accordance with the user's operation.

For example, when the user is not playing the game, the control unit 35 causes the screen display part 32 to display a standby screen. Moreover, for example, when the standby screen is being displayed and the "play" button displayed on the standby screen is pressed by the user, the control unit 35 refers to the game information 311 and causes the screen display part 32 to display a screen for taking a penalty kick. On the screen for taking a penalty kick, a given character, a background and so on are displayed on the screen display part 32 and, for example, the "shoot" button or the like is also displayed on the screen display part 32.

Figure 11A:
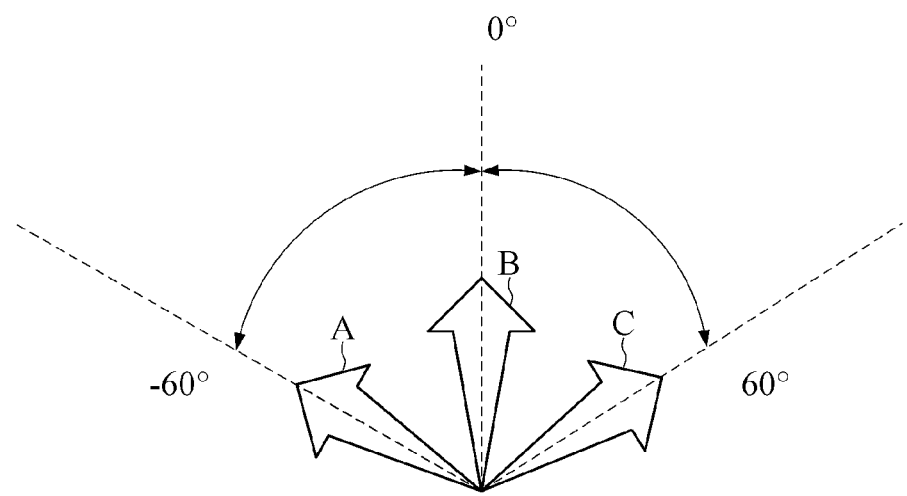
FIG. 11 is a view showing an example of a movement of an arrow as a display object.

Further, when the "shoot" button is pressed by the user on the screen for taking a penalty kick, the control unit 35 notifies it to the server device 2 that the "shoot" button has been pressed (first notification). Thus, the direction set value deciding unit 23 of the server device 2 decides a direction set value and transmits the value to the terminal device 3. As a result, the direction set value 312 is stored into the storage part 31 of the terminal device 3. After that, by using the direction set value 312, the control unit 35 of the terminal device 3 executes a first given movement of an arrow serving as a display object. That is, the control unit 35 causes an arrow pointing in a direction indicated by an initial position of the direction set value 312 to be displayed in a given position on the screen display part 32. Then, the control unit 35 rotates the displayed arrow in the direction indicated by a movement direction of the direction set value 312, thereby starting reciprocation of the arrow. At this time, the control unit 35 rotates the arrow so as to spend a time indicated by a movement time of the direction set value 312 moving from one end to another end. To be specific, for example, as shown in FIG. 11A, the control unit 35 causes an arrow to appear in a position of an arrow A that is within a given position on the screen display part 32, and thereafter, spends a time indicated by a movement time of the direction set value 312 rotating the displayed arrow with the lower end of the arrow as an axis toward a position of an arrow C through a position of an arrow B. Moreover, after the arrow moves to the arrow C position, the control unit 35 rotates the arrow from the arrow C position to the arrow A position through the arrow B position. While the arrow is performing the first given movement, the control unit 35 causes the "stop" button to be displayed on the screen display part 32.

When the "stop" button is pressed by the user operating the operation input part 33 while the arrow is performing the first given movement, namely, the rotation movement, the direction of the arrow that is a first state is decided. After that, the control unit 35 transmits information showing the decided direction to the server device 2.

Figure 11B:
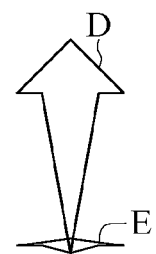

Further, when the "shoot" button is pressed through the operation input part 33 again after the first given movement ends, it is notified to the server device 2 that the "shoot" button has been pressed (second notification). Thus, the power set value deciding unit 24 of the server device 2 decides a power set value and transmits the value to the terminal device 3. As a result, the power set value 313 is stored into the storage part 31 of the terminal device 3. After that, by using the power set value 313, the control unit 35 of the terminal device 3 executes a second given movement of an arrow serving as a display object. That is, the control unit 35 causes an arrow of a length corresponding to an initial power of the power set value 313 to be displayed within a given position on the screen display part 32. Then, the control unit 35 changes the displayed arrow in a direction showing increase/decrease of the power set value 313, thereby starting an expansion/contraction movement of the arrow. At this time, the control unit 35 spends a time indicated by an increase/decrease time of the power set value 313 expanding/contracting the arrow so as to expand/contract from one end to another end. To be specific, for example, as shown in FIG. 11B, the control unit 35 causes an arrow in a state of an arrow E (a state with a power "0.04") to appear in a given position on the screen display part 32, and thereafter, spends a time shown by an increase/decrease time of the power set value 313 expanding the arrow so as to be brought into a state of an arrow D (a state with a power "1"). Moreover, after the arrow is brought into the arrow D state, the control unit 35 contracts the arrow so as to be brought into the arrow E state. While the arrow is performing the second given movement, the control unit 35 causes the "stop" button to be displayed on the screen display part 32 as in the case of the first given movement.

When the "stop" button is pressed by the user operating the operation input part 33 while the arrow is in the second given movement, namely, the expansion/contraction movement, the length of the arrow that is the second state is decided. That is, a power corresponding to the length of the arrow is decided. After that, the control unit 35 transmits information showing the decided power to the server device 2.

In this example embodiment, a concrete method by which the control unit 35 calculates a power from the length of an arrow is not specifically limited. For example, the control unit 35 may be configured to calculate an increase ratio of the length of an arrow decided by the user's operation to the shortest length of the arrow and calculate a power on the basis of the increase ratio. Moreover, the control unit 35 may be configured to acquire a value indicating a power corresponding to the length of an arrow by, for example, referring to a table in which the length of an arrow is associated with the strength of a power stored in the storage part 31 in advance. Moreover, in this example embodiment, after the direction is decided, second notification is performed when the "shoot" button is pressed again. However, the control unit 35 may be configured to perform the abovementioned second notification when the "stop" button is pressed for deciding the direction of an arrow, for example. That is, second press of the "shoot" button can be omitted.

Further, the control unit 35 receives information showing a game result from the server device 2. Then, the control unit 35 causes the screen display part 32 to display an image or the like corresponding to information showing the game result with reference to the game information 311.

The above is an example of the configuration of the terminal device 3. As described above, by using a direction set value and a power set value transmitted from the server device 2, the terminal device 3 executes control so as to be able to execute the virtual penalty kick game.

Now, with reference to FIGS. 12 to 15, an example of the operation of the gaming system 1 will be described. First, with reference to FIG. 12, an example of an overall operation of the server device 2 and the terminal device 3 will be described.

With reference to FIG. 12, when the "shoot" button is pressed by the user on a screen for taking a penalty kick, the control unit 35 notifies it to the server device 2 that the "shoot" button has been pressed (first notification) (step S101).

Upon receiving the first notification that the "shoot" button has been pressed, the direction set value deciding unit 23 of the server device 2 decides a direction set value by referring to the initial position and movement direction table 211, the movement time table 212, and so on (step S201). Then, the direction set value deciding unit 23 transmits the decided direction set value to the terminal device 3 via the information transmitting and receiving unit 22 (step S202). The details of a process when the direction set value deciding unit 23 decides a direction set value will be described later.

Upon receiving the direction set value from the direction set value deciding unit 23, the terminal device 3 stores the received direction set value as the direction set value 312 into the storage part 31. Moreover, the control unit 35, by using the direction set value 312, displays an arrow on the screen display part 32 and rotates the displayed arrow (step S102). That is, the control unit 35 causes an arrow pointing in a direction indicated by an initial position of the direction set value 312 to be displayed within a given position on the screen display part 32. Then, the control unit 35 rotates the displayed arrow in a direction indicated by a movement direction of the direction set value 312. At this time, the control unit 35 rotates the arrow so that the arrow spends a time indicated by a movement time of the direction set value 312 moving from one end to another end.

When the "stop" button is pressed by the user operating the operation input part 33 while the arrow is rotating, the direction of the arrow that is the first state is decided (step S103). After that, the control unit 35 transmits information showing the decided direction to the server device 2.

After the direction of the arrow is decided, when the "shoot" button is pressed with the operation input part 33 again, the control unit 35 notifies it for the second time to the server device 2 that the "shoot" button has been pressed (step S104). In this example embodiment, the second notification is performed when the "shoot" button is pressed again. However, the control unit 35 may be configured to perform the second notification, for example, when the "stop" button to decide the direction of the arrow is pressed.

Upon receiving the second notification from the terminal device 3, the power set value deciding unit 24 decides a power set value by referring to the initial power and increase/decrease table 213, the increase/decrease time table 214, and so on (step S203). Then, the power set value deciding unit 24 transmits the decided power set value to the terminal device 3 via the information transmitting and receiving unit 22 (step S204). The details of a process when the power set value deciding unit 24 decides a power set value will be described later.

Upon receiving the power set value from the power set value deciding unit 24, the terminal device 3 stores the received power set value as the power set value 313 into the storage part 31. Moreover, the control unit 35, by using the power set value 313, displays an arrow on the screen display part 32 and expands/contracts the displayed arrow (step S105). That is, the control unit 35 displays an arrow with a length corresponding to an initial power of the power set value 313, within a given position on the screen display part 32. Then, the control unit 35 changes the displayed arrow into a direction indicated by increase/decrease of the power set value 313. At this time, the control unit 35 expands/contracts the arrow so that the arrow spends a time indicated by an increase/decrease time of the power set value 313 expanding/contracting from one end to another end.

When the "stop" button is pressed by the user operating the operation input part 33 while the arrow is in the expansion/contraction movement, the length of the arrow that is the second state is decided. As a result, a power based on the length of the arrow is decided (step S106).

The control unit 35 transmits information showing the direction decided in processing at step S103 and information showing the power decided in processing at step S106 to the server device 2 via the information transmitting and receiving unit 34 (step S107). Meanwhile, the control unit 35 may be configured to transmit the information showing the direction to the server device 2 at a different timing from a timing for transmitting the information showing the power, for example, when performing the second notification.

The server device 2 acquires the information showing the direction and the information showing the power from the terminal device 3. Then, the server device 2 determines a game result on the basis of the received information and a value generated by the random number generating unit 28 (step S205). For example, the direction success/failure judging unit 25 of the server device 2 performs the first determination, namely, the direction success/failure determination on the basis of a value indicating the received direction and a value generated by the random number generating unit 28. Moreover, the power success/failure judging unit 26 of the server device 2 performs the second determination, namely, the power success/failure determination on the basis of a value indicating the received power and a value generated by the random number generating unit 28. Then, the game result determining unit 27 performs determination of a game result, which is determination whether a goal is scored or not in a virtual penalty kick game, on the basis of the result of the determination of the direction success/failure acquired from the direction success/failure judging unit 25 and the result of the determination of the power success/failure acquired from the power success/failure judging unit 26. The details of processing at step S205 will be described later. After that, the game result determining unit 27 transmits information showing the result of the determination, namely, the game result to the terminal device 3 via the information transmitting and receiving unit 22 (step S206).

The terminal device 3 acquires the information showing the game result from the server device 2. Then, the control unit 35 of the terminal device 3 refers to the game information 311 to make a presentation for showing the game result, for example, display image data based on the acquired information showing the game result (step S108).

The above is an example of the overall operation of the server device 2 and the terminal device 3. Next, with reference to FIG. 13, an example of the processing at step S201 shown in FIG. 12 will be described.

With reference to FIG. 13, the direction set value deciding unit 23 of the server device 2 randomly decides on any value among values of 1 to 4 corresponding to the identification numbers included by the initial position and movement direction table 211. For example, the direction set value deciding unit 23 randomly decides a value by using the random number generating unit 28. Then, the direction set value deciding unit 23 refers to the initial position and movement direction table 211 and decides on an initial position and a movement direction that are associated with an identification number indicated by the decided value (step S301).

Further, the direction set value deciding unit 23 randomly decides on any value among values of 1 to 4 corresponding to the identification numbers included by the movement time table 212. For example, the direction set value deciding unit 23 uses the random number generating unit 28 to randomly decide a value separately from the processing at step S301. Then, the direction set value deciding unit 23 refers to the movement time table 212 and decides on a movement time associated with an identification number indicated by the decided value (step S302).

The direction set value deciding unit 23 decides a direction set value indicating an initial position, a movement direction, a movement time and so on through the operation as described above, for example. Meanwhile, the direction set value deciding unit 23 may execute the processing at step S302 before the processing at step S301 or in parallel with the processing at step S301.

The above is an example of the processing at step S201. Next, with reference to FIG. 14, an example of the processing at step S203 will be described.

With reference to FIG. 14, the power set value deciding unit 24 of the server device 2 randomly decides on any value among values of 1 to 4 corresponding to the identification numbers included by the initial power and increase/decrease table 213. For example, the power set value deciding unit 24 randomly decides on a value by using the random number generating unit 28. Then, the power set value deciding unit 24 refers to the initial power and increase/decrease table 213 and decides on an initial power and increase/decrease that are associated with an identification number indicated by the decided value (step S401).

Further, the power set value deciding unit 24 randomly decides on any value among values of 1 to 4 corresponding to the identification numbers included by the increase/decrease time table 214. For example, the power set value deciding unit 24 uses the random number generating unit 28 and randomly decides a value separately from the processing at step S401. Then, the power set value deciding unit 24 refers to the increase/decrease time table 214 and decides on an increase/decrease time associated with an identification number indicated by the decided value (step S402).

The power set value deciding unit 24 decides a power set value indicating an initial power, increase/decrease, an increase time and so on through the operation as described above, for example. Meanwhile, the power set value deciding unit 24 may execute the processing at step S402 before the processing at step S401 or in parallel to the processing at step S401.

The above is an example of the processing at step S203. Next, with reference to FIG. 15, an example of the processing at step S205 will be described.

With reference to FIG. 15, the server device 2 receives information showing the direction and information showing the power from the terminal device 3. The direction success/failure judging unit 25 of the server device 2 then calculates a value (a change amount) indicating to what extent the direction shown by the information showing the direction has changed from the reference "−60 degrees." Subsequently, the direction success/failure judging unit 25 refers to the direction reference value table 215 and acquires a direction range value in a range including the calculated value from among the direction range values in the direction reference value table 215 (step S501). Then, the direction success/failure judging unit 25 acquires a direction reference value associated with the acquired direction range value (step S502). For example, through such processing, the direction success/failure judging unit 25 acquires a direction reference value on the basis of the information showing the direction.

Further, the direction success/failure judging unit 25 acquires a value that the random number generating unit 28 has randomly generated from among values of 1 to 100, from the random number generating unit 28 (step S503). Meanwhile, the processing at step S503 may be performed before the processing at step S501 or between the processing step S501 and the processing at step S502.

The direction success/failure judging unit 25 performs the first determination, namely, the direction success/failure determination on the basis of the acquired direction reference value and the value generated by the random number generating unit 28. For example, the direction success/failure determination unit 25 checks whether or not the acquired direction reference value is equal to or more than the value generated by the random number generating unit 28 (step S504).

In a case where the acquired direction reference value is equal to or more than the value generated by the random number generating unit 28 (step S504, Yes), the direction success/failure judging unit 25 determines that the first determination, namely, the direction success/failure determination is "success" (step S505). On the other hand, in a case where the acquired direction reference value is less than the value generated by the random number generating unit 28 (step S504, No), the direction success/failure judging unit 25 determines that the first determination, namely, the direction success/failure determination is "failure" (step S506). After the determination at step S505 or step S506, the direction success/failure judging unit 26 notifies information showing the result of the determination to the game result determining unit 27.

Further, the server device 2 executes processing based on the information showing the power acquired from the terminal device 3 in parallel with the processing at step S501 and later described above. For example, the power success/failure judging unit 26 of the server device 2 calculates a value (a change amount) indicating to what extent the power shown by the information showing the power has changed from the reference "0.04." Subsequently, the power success/failure judging unit 26 refers to the power reference value table 216 and acquires a power range value in a range including the calculated value from among the power range values in the power reference value table 216 (step S507). Then, the power success/failure judging unit 26 acquires a power reference value corresponding to the acquired power range value (step S508). For example, through such processing, the power success/failure judging unit 26 acquires a power reference value on the basis of the information showing the power.

Further, the power success/failure judging unit 26 acquires a value randomly generated by the random number generating unit 28 from values of 1 to 100, from the random number generating unit 28 (step S509). The processing at step S509 may be executed before the processing at step S507 or between the processing at step S507 and the processing at step S508.

The power success/failure judging unit 26 performs the second determination, namely, the power success/failure determination on the basis of the acquired power reference value and the value generated by the random number generating unit 28. For example, the power success/failure judging unit 26 checks whether or not the acquired power reference value is equal to or more than the value generated by the random number generating unit 28 (step S510).

In a case where the acquired power reference value is equal to or more than the value generated by the random number generating unit 28 (step S510, Yes), the power success/failure judging unit 26 determines that the second determination, namely, the power success/failure determination is "success" (step S511). On the other hand, in a case where the acquired power reference value is less than the value generated by the random number generating unit 28 (step S510, No), the power success/failure determination unit 26 determines that the second determination, namely, the power success/failure determination is "failure" (step S512). After the determination at step S511 or step S512, the power success/failure judging unit 26 notifies information showing the result of the determination to the game result determining unit 27.

The game result determining unit 27 determines a game result on the basis of the direction success/failure determination result acquired from the direction success/failure judging unit 25, the power success/failure determination result acquired from the power success/failure judging unit 26, and the judgment table 217. For example, the game result determining unit 27 refers to the judgment table 217 and acquires success/failure of the game corresponding to the direction success/failure determination result and the power success/failure determination result. For example, in a case where the success/failure of the direction is "success" and the success/failure of the power is "success," that is, in a case where both the success/failure of the direction and the success/failure of the power are "success" (step S513, Yes), the game result determining unit 27 acquires "goal" as the success/failure of the game (step S514). On the other hand, for example, in a case where either the success/failure of the direction or the success/failure of the power is "failure," such as the success/failure of the direction is "failure" or the success/failure of the power is "failure" (step S513, No), the game result determining unit 27 acquires "miss" as the success/failure of the game (step S513).

The above is an example of the processing at step S205. Meanwhile, the game result determining unit 27 may be configured to decide a specific content of the miss (for example, the ball goes outside the goal's frame, or the ball is caught by the goalkeeper) after the processing at step S515. For example, the game result determining unit 27 can be configured to decide a specific content of the miss on the basis of a range to which the value A corresponding to the position of the arrow belongs.

Thus, the gaming system 1 in this example embodiment has the direction success/failure judging unit 25 and the power success/failure judging unit 26. Moreover, the direction success/failure judging unit 25 and the power success/failure judging unit 26 are configured to determine success/failure of the direction and success/failure of the power on the basis of information showing a direction and a power decided by the user and a value generated by the random number generating unit 28. With such a configuration, the game result determining unit 27 can determine the result of a game on the basis of a direction success/failure determination result and a power success/failure determination result that values to compare are changed by the user's operation. As a result, it is possible to reflect the result of the user's operation onto the result of the game.

According to the gaming system 1 in this example embodiment, by modulating, for example, the values of the direction reference value table 215 and the power reference value table 216 (may also modulate, for example, the movement time table 212 and the initial power and increase/decrease table 213), it is possible to modulate a probability that a game succeeds, and it is possible to modulate a return to the user (Return to Player: RTP). That is, it can also be said that the gaming system 1 in this example embodiment has a return rate modulating unit that modulates a game success rate and a return rate by modulating the values of the respective tables stored in the storage part 21 (for example, the values of the direction reference value table 215, the power reference value table 216). With such a configuration, the gaming system 1 in this example embodiment can module a return rate within a range assumed by the manager while reflecting a factor of a user's operation skill. In other words, the gaming system 1 in this example embodiment can reflect the user's operation onto a result to some extent while using RNG to guarantee fairness and keep a return rate proper.

Further, the gaming system 1 in this example embodiment has the direction set value deciding unit 23 and the power set value deciding unit 24. With such a configuration, the gaming system 1 can change the state of an arrow first displayed on the screen display part 32, how the arrow changes, and so on, every time a virtual penalty kick game is played. Consequently, for example, it is possible to avoid a situation that a game gets easier due to an empirical knowledge acquired by repeatedly playing the penalty kick game. Moreover, because a condition is different for each penalty kick game, it is possible to prevent that the user gets tired.

The gaming system 1 described in this example embodiment is merely an example. For example, in this example embodiment, the game result determining unit 27 determines a game result on the basis of the result of the first determination, namely, the direction success/failure determination and the result of the second determination, namely, the power success/failure determination. However, the gaming system 1 may be configured to determine a game result on the basis of only one of the result of the direction success/failure determination and the result of the power success/failure determination. In other words, the server device 2 may be configured to have only one of a combination of the direction set value deciding unit 23 and the direction success/failure judging unit 25 and a combination of the power set value deciding unit 24 and the power success/failure judging unit 26. Likewise, in the storage part 21, only one of a combination of the initial position and movement direction table 211, the movement time table 212 and the direction reference value table and a combination of the initial power and increase/decrease table 213, the increase/decrease time table 214 and the power reference value table 216. Thus, the server device 2 may have only one of a configuration for performing the direction success/failure determination and a configuration for performing the power success/failure determination.

Further, in this example embodiment, a case where the first given operation, namely, the rotation movement of an arrow and the second given operation, namely, the expansion/contraction movement of an arrow are separately executed is illustrated. However, in the gaming system 1, the rotation movement of an arrow and the expansion/contraction movement of an arrow may be executed simultaneously. That is, the gaming system 1 may be configured to simultaneously execute both the rotation movement of an arrow shown in FIG. 11A and the expansion/contraction movement of an arrow shown in FIG. 11B. In this case, the server device 2 decides a direction set value and a power set value at a stage when the first notification is made. Moreover, when the "stop" button is pushed once by the user, the terminal device 3 decides the first state, namely, the direction of an arrow and, at the same time, decides the second state, namely, the length of the arrow. Moreover, the gaming system 1 may be configured to execute two or more given operations, for example, in addition to the first given operation and the second given operation, a third given operation to enlarge/reduce a circle displayed with a given radius.

Further, in this example embodiment, a direction set value decided by the direction set value deciding unit 23 includes three of an initial position, a movement direction and a movement direction. However, the direction set value deciding unit 23 may decide a direction set value other than the illustrated above. Moreover, for example, the direction set value deciding unit 23 may be configured to decide a direction set value including one or two of the three illustrated above, and the power set value deciding unit 24 may also be configured to decide a power set value including one or two of an initial power, increase/decrease and an increase/decrease time. Moreover, the power set value deciding unit 24 may be configured to decide a power set value including information other than the three illustrated above.

Further, in this example embodiment, it is illustrated that the "shoot" button is pressed as a trigger to start a penalty kick game. However, a starting trigger to instruct an arrow to start a given movement may be something other than illustrated in this example embodiment. For example, the gaming system 1 may use anything other than that the "shoot" button is pressed as a starting trigger, for example, a ball enters a predetermined winning opening in a pachinko machine, a given hit occurs in a slot machine, or a value randomly generated during a given game satisfies a given condition.

Further, in this example embodiment, the gaming system 1 has the server device 2 and the terminal device 3. However, the gaming system 1 is not limited to the illustrated case in this example embodiment. For example, the gaming system 1 may be formed by one information processing device (for example, a pachinko machine, a gaming machine, or the like) that has a function as the server device 2 and a function as the terminal device 3. Moreover, for example, the function as the server device 2 may be distributed and included by a plurality of information processing devices.

Further, the present invention can be applied to a gaming system for playing a game other than a penalty kick game in which a rotation movement of an arrow is done as the first given operation and an expansion/contraction motion of the arrow is done as the second given operation.

For example, the present invention can also be applied to a virtual dart game in which a reciprocation movement of a circle mark T1 along a horizontal axis G1 is done as the first given operation and a reciprocation movement of a circle mark T2 along a vertical axis G2 is done as the second given operation.

FIGS. 16 to 18 are views for describing an example of a virtual dart game. With reference to FIG. 16, in the case of a gaming system for playing a virtual dart game, the control unit 35 of the terminal device 3 refers to the game information 311 stored in the storage part 31 and makes the circle mark T1 reciprocate along the horizontal axis G1 on the screen display part 32. When the user's operation is done via the operation input part 33 in this state, the reciprocating circle mark T1 stops. Consequently, the control unit 35 decides a value indicating an X-axis coordinate in accordance with a position on the horizontal axis G1 where the stopped circle mark T1 is positioned. A value indicating an X-axis coordinate shows, for example, how much a thrown position of a virtually thrown dart corresponding to the position of the stopped circle T1 is off in an X-axis direction (a horizontal direction in FIG. 16) from the center of a circle that is a throwing target used for throwing the dart. Moreover, in the same manner as described above, when the user's operation is done via the operation input part 33 while the circle mark T2 is reciprocating along the vertical axis G2 under control of the control unit 35, the reciprocating circle mark T2 stops. Consequently, the control unit 35 decides a value indicating a Y-axis coordinate in accordance with a position on the vertical axis G2 where the stopped circle mark T2 is positioned. A value indicating a Y-axis coordinate shows, for example, how much a position of a virtually thrown dart corresponding to the position of the stopped circle T2 is off in a Y-axis direction (a vertical direction in FIG. 16) from the center of the circle that is the throwing target. Then, the control unit 35 of the terminal device 3 transmits the decided values indicating the X-axis coordinate and the Y-axis coordinate to the server device 2. The server device 2 acquires the values indicating the X-axis coordinate and the Y-axis coordinate. Then, the game result determining unit 27 of the server device 2 calculates a value Z on the basis of the following equation 3.

<Equation 3>

Herein, Z denotes a calculation target value, X denotes a value indicating an X-axis coordinate, and Y denotes a Y-axis coordinate.

The game result determining unit 27 determines a game result on the basis of the value indicating the X-axis coordinate, the value indicating the Y-axis coordinate and the calculated value Z.

For example, on the basis of the value indicating the X-axis coordinate and the value indicating the Y-axis coordinate, the game result determining unit 27 specifies a range to which a position indicated by the value indicating the X-axis coordinate and the value indicating the Y-axis coordinate belongs in a case where a circle of 360 degrees as the dart throwing target shown in FIG. 16 is divided into a plurality of ranges for each given angle with a predetermined criterion. Then, the game result determining unit 27 acquires a score corresponding to the specified range.

For example, it is assumed that 0 degree is defined on the X-axis on the right side from the center of the throwing target circle and 360 degrees are defined in the upward direction in the case shown in FIG. 16. Then, in the case shown in FIG. 16, of the dart throwing target circle, a range equal to or more than 9 degrees and less than 27 degrees is defined as score "13," a range equal to or more than 27 degrees and less than 45 degrees is defined as score "4," and a range equal to or more than 45 degrees and less than 63 degrees is defined as score "18." Therefore, in the case of determining that a position indicated by the value indicating the X-axis coordinate and the value indicating the Y-axis coordinate is a position of 21 degrees, the game result determining unit 27 determines that the position belongs to the range equal to or more than 9 degrees and less than 27 degrees and acquires the corresponding score 13.

The information associating angles and scores is stored, for example, in the storage part 21 of the server device 2, as an angle and score table that is not shown in the drawings. By referring to the angle and score table stored in the storage part 21, the game result determining unit 27 can acquire a score corresponding to an angle on the basis of an angle specified on the basis of the value indicating the X-axis coordinate and the value indicating the Y-axis coordinate.

Further, the game result determining unit 27 specifies a circle to which the position indicated by the value indicating the X-axis coordinate and the value indicating the Y-axis coordinate belongs from among a plurality of concentric circles forming the dart throwing target, on the basis of the calculated value Z. For example, in the case shown in FIG. 16, there are seven concentric circles "0" to "6." Then, for example, by comparing values indicating the radii of the respective circles with the value Z, the game result determining unit 27 checks a concentric circle range to which the position indicated by the value indicating the X-axis coordinate and the value indicating the Y-axis coordinate belongs. In other words, on the basis of the value Z, the game result determining unit 27 specifies a circle to which the position indicated by the value indicating the X-axis coordinate and the value indicating the Y-axis coordinate belongs from among a circle "6" that is the closest to the center, a circle "5" that is a range outside the circle "6," a circle "4" that is a range outside the circle "5," a circle "3" that is a range outside the circle "4," a circle "2" that is a range outside the circle "3," a circle "1" that is a range outside the circle "2" and an outermost circle "0" that is a range outside the circle "1."

The information associating a value indicating the radius of a circle and identification information for identifying a circle is stored, for example, in the storage part 21 of the server device 2, as a radius information table that is not shown in the drawings. By referring to the radius information table stored in the storage part 21, the game result determining unit 27 can specify a range to which the value Z belongs on the basis of the value Z.

Further, the game result determining unit 27 causes the random number generating unit 28 to randomly decide a value and, on the basis of the value randomly generated by the random number generating unit 28, corrects the range to which the specified value Z belongs. For example, in a case where the range specified on the basis of the value Z is the outermost circle "0" that is the range outside the circle "1," the game result determining unit 27 corrects the specified range to any of the circle "2" that is the range outside the circle "3," the circle "1" that is the range outside the circle "2" and the outermost circle "0" that is the range outside the circle "1" on the basis of the value decided by the random number generating unit 28.

For example, the random number generating unit 28 decides on any value of 1 to 100. Then, the game result determining unit 27, for example, sets to the outermost circle "0" that is the range outside the circle "1" in a case where any value of 1 to 33 is decided on, sets to the circle "1" that is the range outside the circle "2" in a case where any value of 34 to 66 is decided on, and sets to the circle "2" that is the range outside the circle "3" in a case where any value of 67 to 100 is decided on. Thus, on the basis of the value randomly generated by the random number generating unit 28, the game result determining unit 27 corrects the range specified on the basis of the value Z to any of adjacent or near ranges (for example, a plurality of ranges specified with a predetermined criterion).

Meanwhile, the game result determining unit 27 may be configured to correct the range to which the specified value Z belongs only when the range to which the value Z belongs is within a predetermined given range. For example, the game result determining unit 27 can be configured to correct the range to which the specified value Z belongs only when the range is the circle "0" that is the range outside the circle "1," when the range is the circle "5" that is the range outside the circle "6," or when the range is the circle "6" that is the closest to the center.

After that, the game result determining unit 27 acquires information corresponding to the corrected range. Then, the game result determining unit 27 performs an operation based on the acquired information on the acquired score, thereby calculating a final game result. For example, a score calculating table that associates the corrected range with operation information showing the operation on the score is stored in the storage part 21 (see FIG. 18 as an example). Thus, the game result determining unit 27 refers to the score calculating table to acquire the operation information associated with the corrected range and correct the acquired score on the basis of the operation information. For example, in a case where the corrected range is the circle "0" that is located on the outermost side and is the range outside the circle "1," the game result determining unit 27 acquires the operation information "correct to 0 point" associated with the position "0." Thus, the game result determining unit 27 corrects the score (for example, score 13) acquired on the basis of the value indicating the X-coordinate and the value indicating the Y-coordinate to 0.

The game result determining unit 27 calculates a corrected score that is a final game result by such processing, for example.

After the above processing, the game result determining unit 27 transmits information showing the calculated game result to the terminal device 3. Consequently, a presentation corresponding to the game result calculated by the game result determining unit 27 is made, for example, on the screen display part 32 of the terminal device 3.

As described above, the present invention can be applied to a gaming system for playing a virtual dart game as mentioned above. That is, the game result determining unit 27 specifies a position to which a dart is thrown on the basis of a value indicating an X-axis coordinate that is a value corresponding to the state of the circle T1 in the first given operation and a value indicating a Y-axis coordinate that is a value corresponding to the state of the circle T2 in the second given operation. Then, the game result determining unit 27 acquires a score that is a value corresponding to the specified position. Moreover, the game result determining unit 27 acquires operation information associated with a range obtained by correcting a range corresponding to the specified position in accordance with a value randomly generated by the random number generating unit 28. Then, by performing an operation on the acquired score on the basis of the acquired operation information, the game result determining unit 27 calculates a value indicating a final game result.

Meanwhile, such a virtual dart game can be modified in various manners as well as the virtual penalty kick game. For example, a virtual dart game may be configured to change, for example, the initial positions of the circle marks T1 and T2 on the basis of a value randomly decided by the random number generating unit 28 or may be configured to use only one of the circle mark T1 and the circle mark T2.

Further, for example, the present invention can also be applied to a virtual fishing game in which a rotational movement (an operation for specifying an angle value) of a hand Y to rotate and move within a range shown in FIG. 19 (a range from 0 degree to 104 degrees) as the first given operation and a rotational movement (an operation for calculating a power value) of the hand Y as the second given operation as well as the first given operation are performed.

FIGS. 19 to 22 are views for describing an example of a virtual fishing game. With reference to FIG. 19, in the case of a gaming system for playing a virtual fishing game, the control unit 35 of the terminal device 3 refers to the game information 311 stored in the storage part 31 to rotate and move a hand Y on the screen display part 32 (for example, after rotating and moving from a position of 0 degree to a position of 104 degrees, rotate and move from the position of 104 degrees to the position of 0 degree; repeat such rotation and movement). When the user's operation is done via the operation input part 33 in such a state, the rotating and moving hand Y stops. Consequently, the control unit 35 decides an angle value in accordance with a position indicated by the stopped hand Y. Moreover, likewise, when the user's operation is performed via the operation input part 33 while the hand Y is rotating for the second time under control of the control unit 35, the hand Y rotating for the second time stops. Consequently, the control unit 35 decides a power value in accordance with a position indicated by the stopped hand Y. Then, the control unit 35 of the terminal device 3 transmits the decided angle value and power value to the server device 2.

The server device 2 acquires the angle value and the power value. Then, the game result determining unit 27 of the server device 2 causes the random number generating unit 28 to randomly decide a value. Then, the game result determining unit 27 specifies a value used for calculation to be described later on the basis of the value randomly decided by the random number generating unit 28.

FIG. 20 shows an example of an angle value table that is a table used when the server device 2 specifies a value for calculation. The angle value table is previously stored in the storage part 21, for example. Herein, each column of the angle value table shows a range to which an angle value belongs. For example, a first column in FIG. 20 shows that an angle value is equal to or more than 0 degree and equal to or less than 12.99 degrees (i.e., an angle value is less than 13 degrees). Moreover, in the case of a virtual fishing game, it is specified on the basis of a value randomly decided by the random number generating unit 28 which row of the angle value table shown in FIG. 20 is used. For example, the random number generating unit 28 decides on any value of 1 to 100. Then, for example, in a case where any value of 1 to 10 is decided on, the game result determining unit 27 uses a row "1." In a case where any value of 11 to 20 is decided on, the game result determining unit 27 uses a column "2." In such a manner, the game result determining unit 27 specifies a row to be used in the angle value table shown in FIG. 20 on the basis of the value randomly decided by the random number generating unit 28.

As described above, the game result determining unit 27 specifies a row on the basis of a value randomly decided by the random number generating unit 28. Moreover, the game result determining unit 27 specifies a column to which an angle value decided by the user belongs. Then, the game result determining unit 27 acquires a value corresponding to the specified row and column. For example, in a case where the row specified on the basis of the value randomly decided by the random number generating unit 28 is "No. 2" and the angle value is "18," the game result determining unit 27 acquires "from 45.67 to 50.78" as a corresponding value.

Subsequently, the game result determining unit 27 calculates a contrast value (angle) C on the basis of the above acquired value, the angle value, and the range to which the angle value belongs (the range in the angle value table). To be specific, the game result determining unit 27 obtains the contrast value (angle) C on the basis of the following equation 4.

$$C=(F1-F2)(F5-F4)/(F3-F2)+F4 \quad (4)$$

Herein, C denotes the calculation target value, F1 denotes the angle value, F2 denotes a lower limit value of the range to which the angle value belongs, F3 denotes an upper limit value of the range to which the angle value belongs (a value obtained by adding 0.01 to the upper limit value), F4 denotes a lower limit value of the value corresponding to the specified row and column, and F5 denotes an upper limit value of the value corresponding to the specified row and column. For example, in a case where the angle value is "18" and the specified row is "No. 2," the calculation target value is (18-13)(50.78-45.67)/(26-13)+45.67=47.635. That is, assuming the above, the game result determining unit 27 finds 47.64 as the contrast value (angle).

Further, in the storage part 21, a power value table is stored. The game result determining unit 27 obtains a contrast value (power) D by the same processing as in the case of the angle value described above. The method for calculating the contrast value (power) D is the same as in the case of the angle value. Therefore, a detailed description will be omitted.

The game result determining unit 27 determines a game result on the basis of the calculated contrast value (angle) C and contrast value (power) D. First, by referring to a first comparison table as shown in FIG. 21, the game result determining unit 27 checks whether or not a combination of the calculated contrast value (angle) C and contrast value (power) D exists in the first comparison table. For example, in a case where the contrast value (angle) C is "47.64" and the contrast value (power) D is "78.35," a combination of the calculated contrast value (angle) C and contrast value (power) D exists as a pattern 1 in the first comparison table. In a case where a combination of the calculated contrast value (angle) C and contrast value (power) D exists in the first comparison table, the game result determining unit 27 determines as "jackpot."

On the other hand, in a case where a combination of the calculated contrast value (angle) C and contrast value (power) D does not exist in the first comparison table, the game result determining unit 27 refers to a second reference table shown in FIG. 22(A) and acquires a value (any of A to E) corresponding to a range to which the contrast value (angle) C belongs and a value (any of A to E) corresponding to a range to which the contrast value (power) D belongs. Then, the game result determining unit 27 refers to a third comparison table shown in FIG. 22B, and acquires information showing a result which corresponds to the value (any of A to E) corresponding to the range to which the acquired contrast value (angle) C belongs and the value (any of A to E) corresponding to the range to which the contrast value (power) D belongs. Moreover, the game result determining unit 27 decides a final result from various results contained by the acquired information showing the result on the basis of the value randomly decided by the random number generating unit 28. For example, in a case where the value corresponding to the range to which the contrast value (angle) C belongs is A and the value corresponding to the range to which the contrast value (power) D belongs is A, there are consequently four candidates for the result; fish #1, fish #2, fish #3, and missing fish. Then, for example, the game result determining unit 27 decides a final result from among the four candidates in accordance with whether any value of 1 to 100 decided by the random number generating unit 28 is 1 to 25, 26 to 50, 51 to 75, or 76 to 100.

The first comparison table, the second comparison table and the third comparison table are previously stored in the storage part 21, for example.

After the above processing, the game result determining unit 27 transmits the information showing the game result to the terminal device 3. Consequently, a presentation corresponding to the game result calculated by the game result determining unit 27 is made, for example, on the screen display part 32 of the terminal device 3.

As stated above, the present invention can also be applied to a gaming system for playing a virtual fishing game as described above. That is, the game result determining unit 27 calculates a contrast value (angle) that is a first value on the basis of an angle value that is a value corresponding to the state of the hand Y in a first given operation and a value specified on the basis of the angle value and a value decided by the random number generating unit 28. Moreover, the game result determining unit 27 calculates a contrast value (power) that is a second value on the basis of a power value corresponding to the state of the hand Y in a second given operation and a value specified on the basis of the power value a value decided by the random number generating unit 28. Then, the game result determining unit 27 determines a game result on the basis of a contrast value (angle) C and a contrast value (power) D. For example, the game result determining unit 27 determines a game result on the basis of whether or not a combination of the contrast value (angle) C and the contrast value (power) D is a predetermined combination. Moreover, the game result determining unit 27 determines a game result on the basis of a range to which the contrast value (angle) C belongs and a range to which the contrast value (power) D belongs.

Such a virtual fishing game can also be modified in various manners in the same manner as a virtual penalty kick game and a virtual dart game. For example, a virtual fishing game may be configured to change an initial position of the hand Y on the basis of a value randomly decided by the random number generating unit 28 and may be configured to execute only one of the first given operation and the second given operation.

Further, for example, the present invention can also be applied to a virtual golf game in which a reciprocation movement of a circle mark along a horizontal axis is done as a first given operation and a reciprocation movement of the circle mark along the horizontal axis as well as the first given operation is performed as a second given operation.

In the virtual golf game, for example, a value indicating a direction is decided in accordance with the position of the circle mark having stopped during the first given operation, and a value indicating power is decided in accordance with the position of the circle mark having stopped during the second given operation. Moreover, in the virtual golf game, after the value indicating the direction and the value indicating the power are decided, the game result determining unit 27 of the server device 2 decides the direction and magnitude of wind in accordance with a value randomly decided by the random number generating unit 28. Then, the game result determining unit 27 determines a final game result by correcting the value indicating the direction and the value indicating the power in accordance with the direction and magnitude of wind decided in accordance with the value randomly decided by the random number generating unit 28.

For example, in the case of a tailwind, the game result determining unit 27 corrects the value indicating the power so as to become larger as the strength of the wind becomes stronger. Moreover, the game result determining unit 27 performs the above control so as to become larger correction as the direction indicated by the value indicating the direction and the direction of the wind matches more. In other words, the game result determining unit 27 determines a game result on the basis of a value indicating a direction that is a value corresponding to the state of the circle mark in the first given operation, a value indicating a power that is a value corresponding to the state of the circle mark in the second given operation, and the direction and strength of wind determined based on a value generated by the random number generating unit 28.

Such a virtual golf game can also be modified in various manners in the same manner as a virtual penalty kick game, a virtual dart game and a virtual vishing game. For example, a virtual golf game may be configured to change the initial position of the circle mark on the basis of a value randomly decided by the random number generating unit 28 and may be configured to execute only one of the first given operation and the second given operation.

The present invention may be applied to a virtual game, other than the virtual penalty kick game, dart game, fishing game and golf game described above, in which a game result is determined on the basis of a result of an operation by the user during the first given operation or the second given operation and a value randomly generated by the random number generating unit 28.

A program described in the example embodiments is stored in a storage device or recorded on a computer-readable recording medium. For example, the recording medium is a portable medium such as a flexible disk, an optical disk, a magneto-optical disk and a semiconductor memory.

Although the present invention has been described above with reference to the example embodiments, the present invention is not limited to the example embodiments described above. The configurations and details of the present invention can be changed in various manners that can be understood by those skilled in the art within the scope of the present invention.

DESCRIPTION OF NUMERALS

1 gaming system
2 server device
21 storage part
211 initial position and movement direction table
212 movement time table
213 initial power and increase/decrease table
214 increase/decrease time table
215 direction reference value table
216 power reference value table
217 judgment table
22 information transmitting and receiving unit
23 direction set value deciding unit
24 power set value deciding unit
25 direction success/failure judging unit
26 power success/failure judging unit
27 game result determining unit
28 random number generating unit
3 terminal device
31 storage part
311 game information
312 direction set value
313 power set value
32 screen display part
33 operation input part
34 information transmitting and receiving unit
35 control unit

The invention claimed is:

1. A gaming system comprising:
a state deciding unit configured to accept an input from a user while a display object displayed on a display screen is performing a given movement and thereby decide a state of the display object performing the given movement;
a random number generating unit configured to randomly generate a value from among numerical values in a predetermined given range; and
a determining unit configured to determine a game result based on a value corresponding to the state of the display object decided by the state deciding unit and the value generated by the random number generating unit, wherein:
the state deciding unit includes: a first state deciding unit configured to accept an input from the user while the display object displayed on the display screen is performing a first given movement and thereby decide a state of the display object performing the first given movement; and a second state deciding unit configured to accept an input from the user while the display object displayed on the display screen is performing a second given movement and thereby decide a state of the display object performing the second given movement;
the determining unit is further configured to determine the game result based on the value corresponding to the state of the display object performing the first given movement decided by the first state deciding unit, a value corresponding to the state of the display object performing the second given movement decided by the second state deciding unit, and the value generated by the random number generating unit; and
the determining unit is further configured to: in accordance with a position specified on a basis of the value corresponding to the state of the display object performing the first given movement decided by the first state deciding unit and the value corresponding to the state of the display object performing the second given movement decided by the second state deciding unit, acquire a given score previously associated with the position; acquire given operation information corresponding to a range obtained by correcting a range corresponding to the position in accordance with the value generated by the random number generating unit; operate the score on a basis of the operation information, and thereby calculate a value indicating the game result.

2. The gaming system according to claim 1, wherein the determining unit is further configured to: perform first judgment based on the value corresponding to the state of the display object performing the first given movement decided by the first state deciding unit and the value generated by the random number generating unit; perform second judgment based on the value corresponding to the state of the display object performing the second given movement decided by the second state deciding unit and the value generated by the random number generating unit at a different moment from when performing the first judgment; and determine the game result based on the first judgment and the second judgment.

3. The gaming system according to claim 1, wherein the determining unit is further configured to: calculate a first value based on the value corresponding to the state of the display object performing the first given movement decided by the first state deciding unit and based on a value specified on a basis of the value corresponding to the state of the display object performing the first given movement and the value generated by the random number generating unit; calculate a second value based on the value corresponding to the state of the display object performing the second given movement decided by the second state deciding unit and based on a value specified on a basis of the value corresponding to the state of the display object performing the second given movement and the value generated by the random number generating unit; and determine the game result based on the calculated first value and second value.

4. The gaming system according to claim 1, wherein the determining unit is further configured to, on a basis of the value generated by the random number generating unit, correct the value corresponding to the state of the display object performing the first given movement decided by the first state deciding unit and the value corresponding to the state of the display object performing the second given movement decided by the second state deciding unit, and thereby calculate the value indicating the game result.

5. The gaming system according to claim 1, wherein the determining unit is further configured to: acquire a range value indicating what range in the whole given movement the state of the display object decided by the state deciding unit is included; on a basis of a previously stored correspondence table showing correspondence between the range value and a reference value, acquire the reference value corresponding to the range value; and determine the game result based on the acquired reference value and the value generated by the random number generating unit.

6. The gaming system according to claim 1, further comprising a set value deciding unit configured to decide a set value for controlling the given movement performed by the display object in accordance with a predetermined start trigger that instructs start of the given movement by the display object,
wherein the state deciding unit is further configured to, on a basis of the set value decided by the set value deciding unit, control so that the display object starts the given movement.

7. A gaming method executed by a gaming system,
accepting an input from a user while a display object displayed on a display screen is performing a first given movement and thereby deciding a first state of the display object performing the first given movement, and accepting an input from the user while the display object displayed on the display screen is performing a second given movement and thereby deciding a second state of the display object performing the second given movement;
randomly generating a value from among numerical values in a predetermined given range as a randomly-generated value; and
determining a game result based on a value corresponding to the first state of the display object performing the first given movement, a value corresponding to the second state of the display object performing the second given movement, and the randomly-generated value; and in accordance with a position specified on a basis of the value corresponding to the first state of the display object performing the first given movement and the value corresponding to the second state of the display object performing the second given movement, acquiring a given score previously associated with the position, acquiring given operation information corresponding to a range obtained by correcting a range corresponding to the position in accordance with the randomly-generated value, operating the score on a basis of the operation information, and thereby calculating a value indicating the game result.

8. A non-transitory computer-readable medium for storing a computer program comprising instructions that, when executed by a server device, cause the server device to perform operations comprising:
accepting, from an external device, information showing a first state of a display object displayed on a display screen, the first state being decided by a first state deciding unit configured to accept an input from a user while the display object is performing a first given movement and thereby deciding the first state of the display object performing the first given movement, and accepting, from the external device, information showing a second state of the display object displayed on the display screen, the second state being decided by a second state deciding unit configured to accept an input from the user while the display object is performing a second given movement and thereby deciding a second state of the display object performing the second given movement;
randomly generating a value from among numerical values in a predetermined given range as a randomly-generated value;
determining a game result based on a value corresponding to the first state of the display object performing the first given movement, a value corresponding to the second state of the display object performing the second given movement, and the randomly-generated value;
in accordance with a position specified on a basis of the value corresponding to the first state of the display object performing the first given movement and the value corresponding to the second state of the display object performing the second given movement, acquiring a given score previously associated with the position, acquiring given operation information corresponding to a range obtained by correcting a range corresponding to the position in accordance with the randomly-generated value, operating the score on a basis of the operation information, and thereby calculating a value indicating the game result; and transmitting the determined game result to the external device.

* * * * *